(12) United States Patent
Lee et al.

(10) Patent No.: US 10,936,340 B2
(45) Date of Patent: Mar. 2, 2021

(54) APPARATUS AND METHOD FOR PERFORMING SELECTIVE APPLICATION PRELOADING IN ELECTRONIC DEVICE

(71) Applicant: Samsung Electronics Co., Ltd., Suwon-si (KR)

(72) Inventors: Hyojeong Lee, Suwon-si (KR); Jinkyu Koo, Yongin-si (KR); Kwonsik Kim, Suwon-si (KR); Ki-Beom Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 15/765,104

(22) PCT Filed: Sep. 29, 2016

(86) PCT No.: PCT/KR2016/010895
§ 371 (c)(1),
(2) Date: Mar. 30, 2018

(87) PCT Pub. No.: WO2017/057912
PCT Pub. Date: Apr. 6, 2017

(65) Prior Publication Data
US 2018/0293087 A1   Oct. 11, 2018

(30) Foreign Application Priority Data
Oct. 2, 2015   (KR) .................. 10-2015-0139290

(51) Int. Cl.
*G06F 17/00*     (2019.01)
*G06F 9/445*     (2018.01)
(Continued)

(52) U.S. Cl.
CPC ........ *G06F 9/44578* (2013.01); *G06F 3/0482* (2013.01); *G06F 3/0488* (2013.01);
(Continued)

(58) Field of Classification Search
CPC ........ G06F 9/485; G06F 3/0488; G06F 9/445; G06F 9/5027
See application file for complete search history.

(56) References Cited

U.S. PATENT DOCUMENTS 6,049,325 A    4/2000   Alexander
8,812,658 B1 *  8/2014  Teeraparpwong .... G06F 16/958
                                                   709/224
(Continued)

FOREIGN PATENT DOCUMENTS

CN         102929532 B      7/2015
KR     10-2013-0039498 A    4/2013
(Continued)

OTHER PUBLICATIONS

Top 22 3D Touch tips and tricks iPhone 6s users must know, by Kelly Hodgkins, Sep. 29, 2015, 10 pages, retrieved from http://www.iphonehacks.com/2015/09/iphone-6s-3d-touch-tips-tricks.html.*

(Continued)

*Primary Examiner* — Scott T Baderman
*Assistant Examiner* — Barbara M Level
(74) *Attorney, Agent, or Firm* — Jefferson IP Law, LLP

(57) ABSTRACT

The present disclosure relates to an apparatus and method for selecting a preloading application by considering a user pattern of an electronic device and for determining a preloading level. The electronic device according to the present disclosure includes a data management unit for determining a score of an application, and an application selection unit for selecting a preloading application based on the score of the application. In addition, the electronic device may further include a preloading level determination unit for determining a preloading level based on a variable indicating a (Continued)

state of the electronic device with respect to the selected preloading target application and the score.

23 Claims, 20 Drawing Sheets

(51) Int. Cl.
*G06F 3/0488* (2013.01)
*G06F 3/0481* (2013.01)
*G06F 3/0482* (2013.01)
*G06F 9/451* (2018.01)

(52) U.S. Cl.
CPC .......... *G06F 3/04817* (2013.01); *G06F 9/445* (2013.01); *G06F 9/451* (2018.02)

(56) References Cited

U.S. PATENT DOCUMENTS

| | | | | |
|---|---|---|---|---|
| 10,459,887 B1* | 10/2019 | Dvortsov | .............. | G06F 3/0485 |
| 2003/0220984 A1 | 11/2003 | Jones et al. | | |
| 2005/0066283 A1* | 3/2005 | Kanamaru | .............. | G06F 9/445 |
| | | | | 715/749 |
| 2007/0089146 A1 | 4/2007 | Ikeda et al. | | |
| 2010/0231533 A1* | 9/2010 | Chaudhri | .............. | G06F 3/0482 |
| | | | | 345/173 |
| 2012/0167122 A1* | 6/2012 | Koskimies | ............ | G06F 9/5027 |
| | | | | 719/328 |
| 2012/0324481 A1* | 12/2012 | Xia | ........................ | G06F 9/485 |
| | | | | 719/320 |
| 2013/0046966 A1* | 2/2013 | Chu | ..................... | G06F 9/4406 |
| | | | | 713/2 |
| 2014/0372356 A1* | 12/2014 | Bilal | ....................... | G06F 9/445 |
| | | | | 706/46 |
| 2014/0372943 A1* | 12/2014 | Kroupa | ................. | G06F 3/0482 |
| | | | | 715/808 |
| 2015/0026415 A1 | 1/2015 | Clausen et al. | | |
| 2015/0186545 A1* | 7/2015 | Krutzler | ............. | G06F 3/04883 |
| | | | | 715/234 |
| 2016/0364272 A1* | 12/2016 | Hou | ....................... | G06F 9/5016 |

FOREIGN PATENT DOCUMENTS

| | | |
|---|---|---|
| KR | 10-2015-0004459 A | 1/2015 |
| KR | 10-2015-0010563 A | 1/2015 |

OTHER PUBLICATIONS

Kelly Hodgkins, "Top 22 3D Touch tips and tricks iPhone 6s users must know", Sep. 29, 2015, XP055513610, Retrieved from the Internet: URL:http://www.iphonehacks.com/2015/09/iphone-6s-3d-touch-tips-and-ricks.html [retrieved on Oct. 9, 2018].

Extended European Search Report dated May 9, 2019, issued in European Patent Application No. 16852058.3.

European Search Report dated Dec. 13, 2018, issued in European Patent Application No. 16852058.3.

European Office Action dated Jun. 9, 2020, issued in European Application No. 16 852 058.3-1203.

* cited by examiner

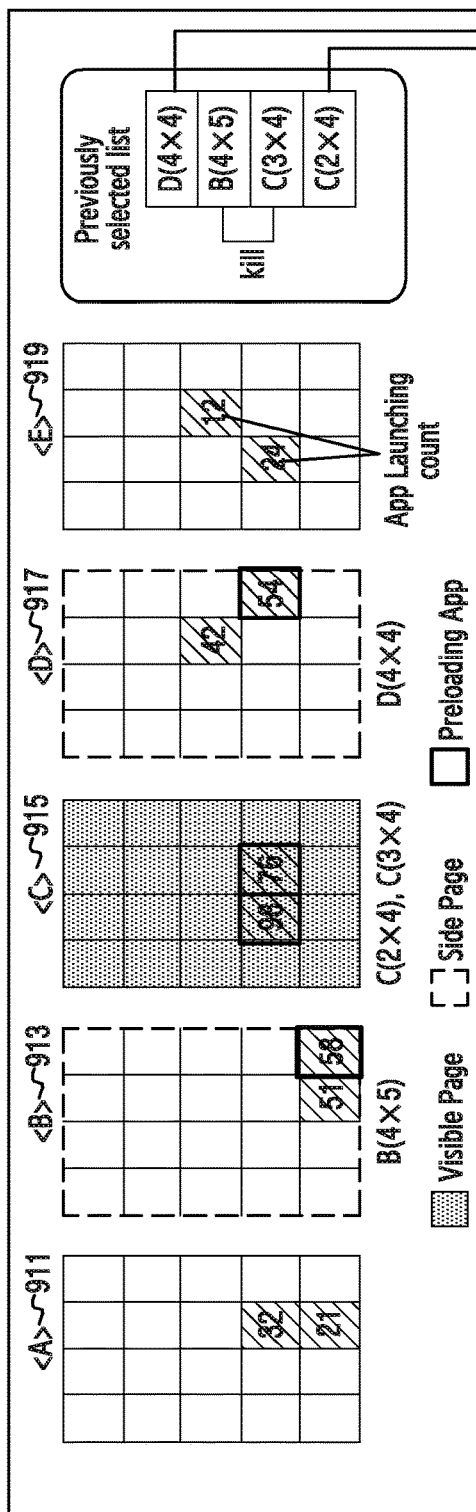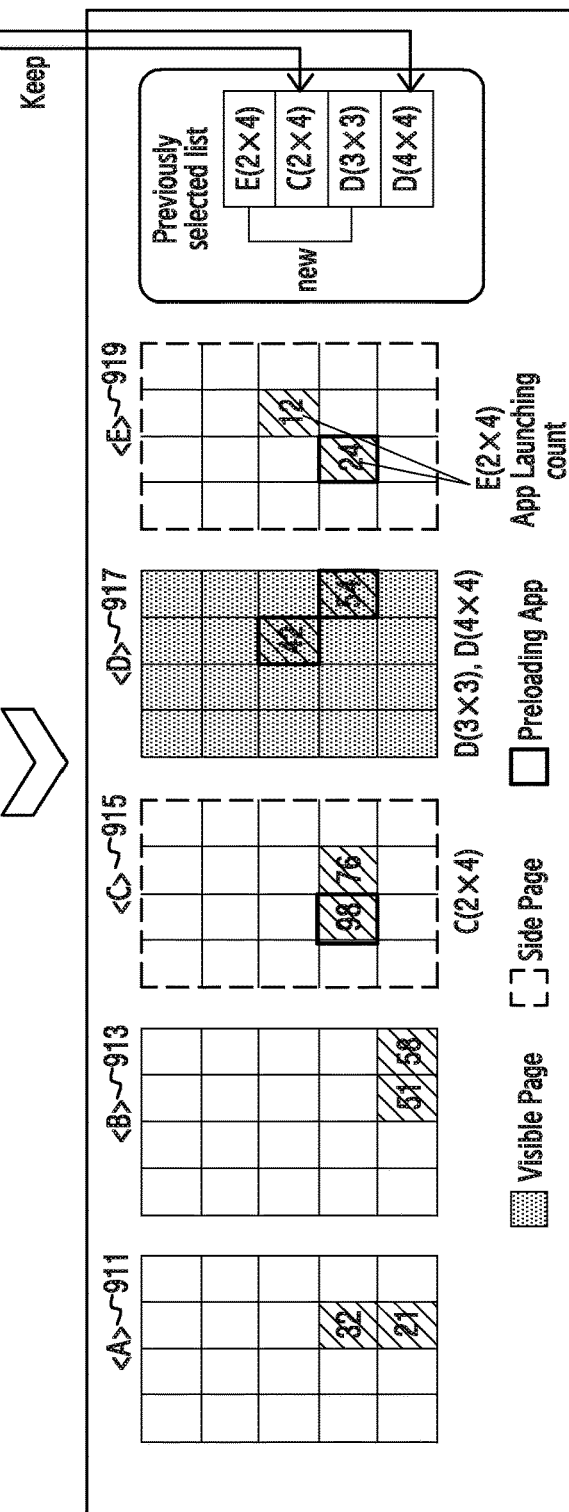
FIG. 9A
FIG. 9B

APPARATUS AND METHOD FOR PERFORMING SELECTIVE APPLICATION PRELOADING IN ELECTRONIC DEVICE

CROSS-REFERENCE TO RELATED APPLICATION(S)

This application is a U.S. National Stage application under 35 U.S.C. § 371 of an International application number PCT/KR2016/010895, filed on Sep. 29, 2016, which is based on and claimed priority of a Korean patent application number 10-2015-0139290, filed on Oct. 2, 2015, in the Korean Intellectual Property Office, the disclosure of which is incorporated by reference herein in its entirety.

TECHNICAL FIELD

The present disclosure relates to an apparatus and method for executing an application in an electronic device.

BACKGROUND ART

An application program used in a smart platform such as mobile, smart Television (TV), Internet of things (IoT), and the like is called an application. If the application is launched, resources such as classes, layouts, images, libraries, or the like are read by a memory to perform a computation. Due to such an operation, a latency time may be required to some extents to completely execute the launched application in a screen. Recently, with the improved performance of a terminal, application execution performance is improved. However, optionally, if an application with a great amount of resources is executed or a current state of the terminal is not good, an application launching speed experienced by a user may be increased.

The smart platform uses a preloading scheme to improve the application launching speed. A manufacturer of an electronic device may select an application, which is frequently used or important in manufactured goods, as a preloading application. If a specific application is selected as the preloading application in the smart platform, a launching time can be shortened in a case where the user executes the application at a later time through pre-execution immediately after booting the electronic device. If the application is executed for the first time, the launching time may be increased due to required resources and execution of various computational tasks. These tasks may be executed in advance to maintain a background state. In general, if the application is executed, a launching operation begins immediately after a start event is received from the user. However, in case of a preloading target application, a launching process is partially complete in advance through the pre-execution immediately after booting, and thus a launching time experienced by the user can be decreased.

SUMMARY

An embodiment of the present disclosure provides a preloading application selection criterion which is differentiated from the conventional preloading application selection method, and may provide a criterion for determining a preloading level by considering a current state of an electronic device.

Another embodiment of the present disclosure provides an apparatus and method for selecting a preloading application in an electronic device to which a smart platform is applied.

Another embodiment of the present disclosure provides an apparatus and method for selecting a preloading application in accordance with an external device interworking with an electronic device to which a smart platform is applied.

Another embodiment of the present disclosure provides an apparatus and method for selecting a preloading application in accordance with an application (APP) page list in an electronic device to which a smart platform is applied.

Another embodiment of the present disclosure provides an apparatus and method for determining a list order in an APP page list in an electronic device to which a smart platform is applied.

Another embodiment of the present disclosure provides an apparatus and method for selecting a preloading application in accordance with an input interface in an electronic device to which a smart platform is applied.

Another embodiment of the present disclosure provides an apparatus and method for selecting a preloading application in accordance with a classification of an application region in an electronic apparatus to which a smart platform is applied.

Another embodiment of the present disclosure provides an apparatus and method for detecting a user's touch input through a touch panel and selecting a preloading application in accordance with a classification of the touch input in an electronic device to which a smart platform is applied.

Another embodiment of the present provides an apparatus and method for sharing and updating information regarding a preloading application through interworking between various electronic devices to which a smart platform is applied.

Another embodiment of the present disclosure provides an apparatus and method for determining a preloading level for a preloading application in an electronic device to which a smart platform is applied.

Another embodiment of the present disclosure is to provide an apparatus and method for maintaining and updating history data in an electronic device to which a smart platform is applied.

Another embodiment of the present disclosure provides an apparatus and method for selecting a preloading application by considering an application execution time through history data in an electronic device to which a smart platform is applied.

An electronic device according to various embodiments of the present disclosure includes a first memory configured to store applications, a second memory configured to temporarily store the applications to be executed, and a processor configured to preload at least one application to the second memory based on a score for each application determined based on at least one of a launching count and a launching time of the applications.

A method of operating an electronic device according to various embodiments of the present disclosure includes selecting at least one application of a preloading target based on a score for each application determined based on at least one of a launching count and a launching time of applications stored in a first memory; and preloading the at least one application to a second memory.

BRIEF DESCRIPTION OF THE DRAWINGS

FIGS. 9A and 9B illustrate a method of selecting a preloading application based on a change in a displayed page according to an embodiment of the present disclosure;

DETAILED DESCRIPTION

Figure 1:
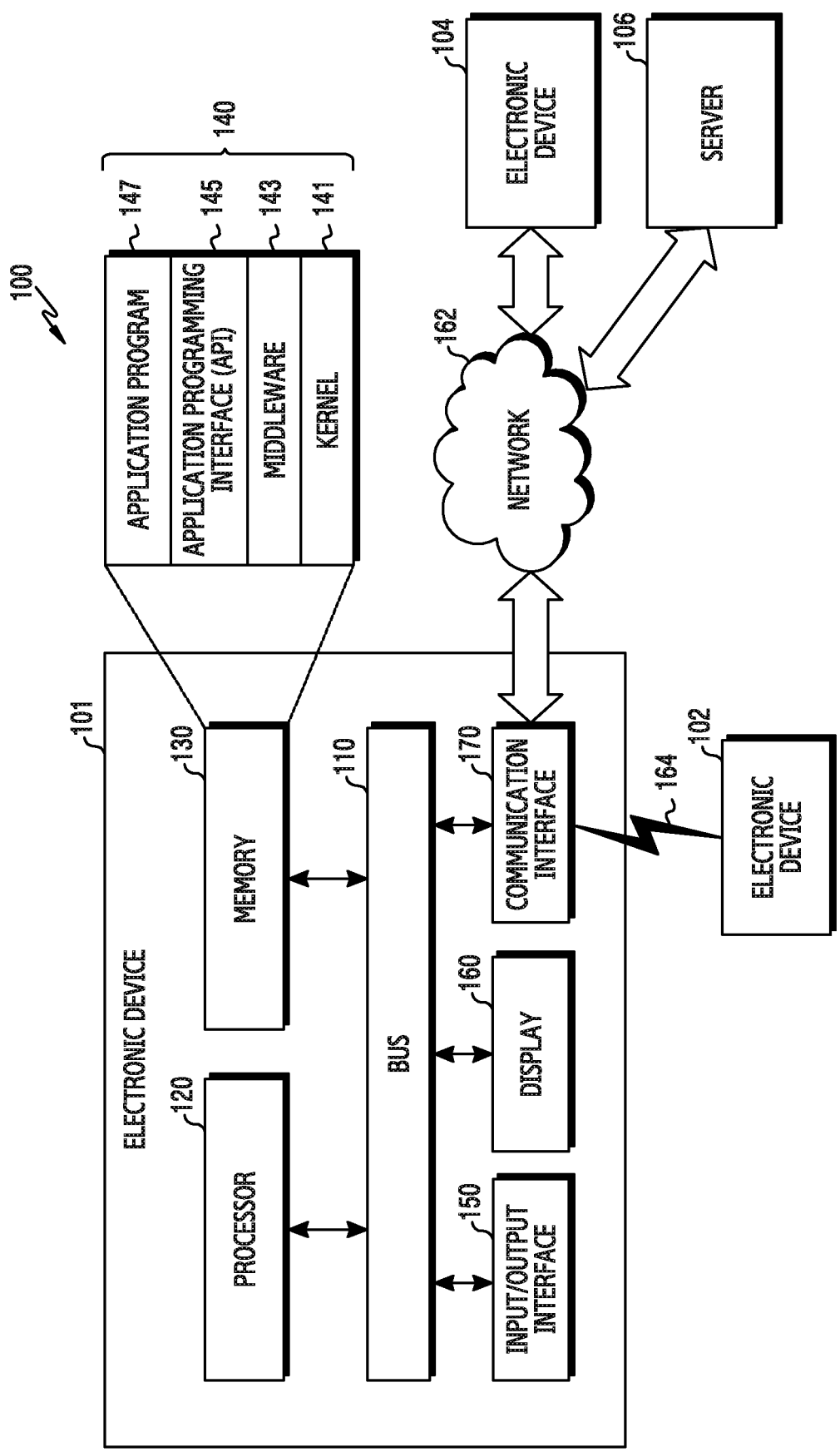
FIG. 1 illustrates an electronic device in a network environment according to an embodiment of the present disclosure.

Hereinafter, various embodiments of the present document are described with reference to the accompanying drawings. It should be appreciated, however, it is not intended to limit the embodiments of the present document to the particular form disclosed, but, on the contrary, it is intended to cover all modifications, equivalents, and alternatives falling within the spirit and scope of the embodiments of the present document. Like reference numerals denote like components throughout the drawings. Further, in the following description of the present disclosure, well-known functions or constructions are not described in detail since they would obscure the invention in unnecessary detail.

An expression "have", "may have", "include" or "may include" or the like used in the present document is intended to indicate a presence of a corresponding characteristic (e.g., a number, a function, an operation, or a component such as a component), and should be understood that there are additional possibilities of one or more other characteristics.

In the present document, an expression "A or B", "A and/or B", or "one or more of A and/or B" or the like may include all possible combinations of items enumerated together. For example, "A or B", "at least one of A and B", or "at least one of A or B" may indicate all cases where: (1) at least one A is included; (2) at least one B is included; and (3) at least one A and at least one B are both included.

Although expressions such as "$1^{st}$", "$2^{nd}$", "first", and "second" may be used in the present document to express various components, it is not intended to limit the corresponding components. For example, the above expressions may be used to distinguish one component from another component. For example, a $1^{st}$ user device and a $2^{nd}$ user device are both user devices, and indicate different user devices. For example, a $1^{st}$ component may be termed a $2^{nd}$ component, and similarly, the $2^{nd}$ component may be termed the $1^{st}$ component without departing from the scope of the present document.

If a certain component (e.g., the $1^{st}$ component) is mentioned as being "operatively or communicatively coupled with/to" or "connected to" a different component (e.g., the $2^{nd}$ component), it is to be understood that the certain component is directly coupled with/to another component or can be coupled with/to the different component via another component (e.g., a $3^{rd}$ component). On the other hand, if the certain component (e.g., the $1^{st}$ component) is mentioned as being "directly coupled with/to" or "directly connected to" the different component (e.g., the $2^{nd}$ component), it may be understood that another component (e.g., the $3^{rd}$ component) is not present between the certain component and the different component.

An expression "configured to" used in the present document may be interchangeably used with, for example, "suitable for", "having the capacity to", "designed to", "adapted to", "made to", or "capable of" according to a situation. A term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

Terms used in the present document are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the present document. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present document should not be interpreted to exclude the embodiments of the present document.

An electronic device according to various embodiments of the present document may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device. According to various embodiments, the wearable device may include at least one of an accessory-type device (e.g., a watch, a ring, a bracelet, an anklet, a necklace, glasses, contact lenses, or a Head-Mounted Device (HMD)), a fabric- or clothes-integrated device (e.g., electronic clothes), a body attaching-type device (e.g., a skin pad or tattoo), or a body implantable device (e.g., an implantable circuit).

According to some embodiments, the electronic device may be a home appliance. The home appliance may include, for example, at least one of a TeleVision (TV), a Digital Video Disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ PlayStation™), an electronic dictionary, an electronic key, a camcorder, and an electronic picture frame.

According to other embodiments, the electronic device may include at least one of various medical devices (e.g., various portable medical measuring devices (e.g., a blood sugar measuring device, a hear rate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Navigation Satellite System (GNSS), an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, Point Of Sales (POS) of shops, and Internet of things (e.g., a light bulb, various sensors, an electric or gas meter, a sprinkler device, a fire alarm, a thermostat, a streetlamp, a toaster, a fitness equipment, a hot water tank, a heater, a boiler, etc.).

According to some embodiments, the electronic device may include at least one of furniture or a part of buildings/constructions, an electronic board, an electronic signature input device, a projector, and various measurement machines (e.g., water supply, electricity, gas, propagation measurement machine, etc.). In various embodiments, the electronic device may be one or more combinations of the aforementioned various devices. According to some embodiments, the electronic device may be a flexible device. Further, the electronic device according to an embodiment of the present document is not limited to the aforementioned devices, and may include a new electronic device based on technical progress.

Hereinafter, an electronic device according to various embodiments will be described with reference to the accompanying drawings. The term 'user' used in the various embodiments may refer to a person who uses the electronic device or a device (e.g., an Artificial Intelligence (AI) electronic device) which uses the electronic device.

Referring to FIG. 1, an electronic device 101 in a network environment 100 is disclosed according to various embodiments. The electronic device 101 may include a bus 110, a processor 120, a memory 130, an input/output interface 150, a display 160, and a communication interface 170. In a certain embodiment, the electronic device 101 may omit at least one of the aforementioned components or may additionally include other components.

The bus 110 may include a circuit for connecting the aforementioned components 110 to 170 to each other and for delivering communication (e.g., a control message and/or data) between the aforementioned components.

The processor 120 may include one or more of a Central Processing Unit (CPU), an Application Processor (AP), and a Communication Processor (CP). The processor 120 may control, for example, at least one of other components of the electronic device 101 and/or may execute an arithmetic operation or data processing for communication.

The memory 130 may include a volatile and/or non-volatile memory. The memory 130 may store, for example, a command or data related to at least one other component of the electronic device 101. According to an embodiment, the memory 130 may store a software and/or a program 140. The program 140 may include, for example, a kernel 141, a middleware 143, an Application Programming Interface (API) 145, and/or an application program (or an "application") 147, or the like. At least part of the kernel 141, middleware 143, or API 145 may be referred to as an Operating System (OS).

The kernel 141 may control or manage, for example, system resources (e.g., the bus 110, the processor 120, the memory 130, etc.) used to execute an operation or function implemented in other programs (e.g., the middleware 143, the API 145, or the application program 147). Further, the kernel 141 may provide an interface capable of controlling or managing the system resources by accessing individual components of the electronic device 101 in the middleware 143, the API 145, or the application program 147.

The middleware 143 may perform, for example, a mediation role so that the API 145 or the application program 147 can communicate with the kernel 141 to exchange data.

Further, the middleware 143 may handle one or more task requests received from the application program 147 according to a priority. For example, the middleware 143 may assign a priority of using the system resources (e.g., the bus 110, the processor 120, or the memory 130) of the electronic device 101 to at least one of the application programs 147. For instance, the middleware 143 may process the one or more task requests according to the priority assigned to the at least one of the application programs, and thus may perform scheduling or load balancing on the one or more task requests.

The API 145 may include at least one interface or function (e.g., instruction), for example, for file control, window control, video processing, or character control, as an interface capable of controlling a function provided by the application 147 in the kernel 141 or the middleware 143.

The input/output interface 150 may play a role of an interface for delivering, for example, a command or data input from a user or a different external device(s) to the different components of the electronic device 101. Further, the input/output interface 150 may output a command or data received from the different component(s) of the electronic device 101 to the different external device.

The display 160 may include various types of displays, for example, a Liquid Crystal Display (LCD) display, a Light Emitting Diode (LED) display, an Organic Light-Emitting Diode (OLED) display, a MicroElectroMechanical Systems (MEMS) display, or an electronic paper display. The display 160 may display, for example, a variety of contents (e.g., text, image, video, icon, symbol, etc.) to the user. The display 160 may include a touch screen. For example, the display 160 may receive a touch, gesture, proximity, or hovering input by using a stylus pen or a part of a user's body.

The communication interface 170 may establish, for example, communication between the electronic device 101 and the external device (e.g., a $1^{st}$ external electronic device 102, a $2^{nd}$ external electronic device 104, or a server 106). For example, the communication interface 170 may communicate with the external device (e.g., the $2^{nd}$ external electronic device 104 or the server 106) by being connected to a network 162 through wireless communication or wired communication.

As a cellular communication protocol, the wireless communication may use, for example, at least one of Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), and the like. Further, the wireless communication may include, for example, a short-range communication 164. The short-range communication 164 may include, for example, at least one of Wireless Fidelity (WiFi), Bluetooth, Near Field Communication (NFC), Global Navigation Satellite System (GNSS), and the like. According to a usage region or a bandwidth or the like, the GNSS may include, for example, at least one of Global Positioning System (GPS), Global Navigation Satellite System (Glonass), Beidou Navigation Satellite System (hereinafter, "Beidou"), Galileo, the European global satellite-based navigation system, and the like. Hereinafter, the "GPS" and the "GNSS" may be used interchangeably in the present document. The wired communication may include, for example, at least one of Universal Serial Bus (USB), High Definition Multimedia Interface (HDMI), Recommended Standard-232 (RS-232), power-line communication, Plain Old Telephone Service (POTS), and the like. The network 162 may include, for example, at least one of a telecommunications network, a computer network (e.g., LAN or WAN), the Internet, and a telephone network.

Each of the $1^{st}$ and $2^{nd}$ external electronic devices 102 and 104 may be the same type or different type of the electronic device 101. According to an embodiment, the server 106 may include a group of one or more servers. According to various embodiments, all or some of operations executed by the electronic device 101 may be executed in a different one or a plurality of electronic devices (e.g., the electronic device 102 or 104 or the server 106). According to an embodiment, if the electronic device 101 needs to perform a certain function or service either automatically or at a request, the electronic device 101 may request at least a part of functions related thereto alternatively or additionally to a different electronic device (e.g., the electronic device 102 or 104 or the server 106) instead of executing the function or the service autonomously. The different electronic device (e.g., the electronic device 102 or 104 or the server 106) may execute the requested function or additional function, and may deliver a result thereof to the electronic device 101. The electronic device 101 may provide the requested function or service either directly or by additionally processing the received result. For this, for example, a cloud computing, distributed computing, or client-server computing technique may be used.

Figure 2:
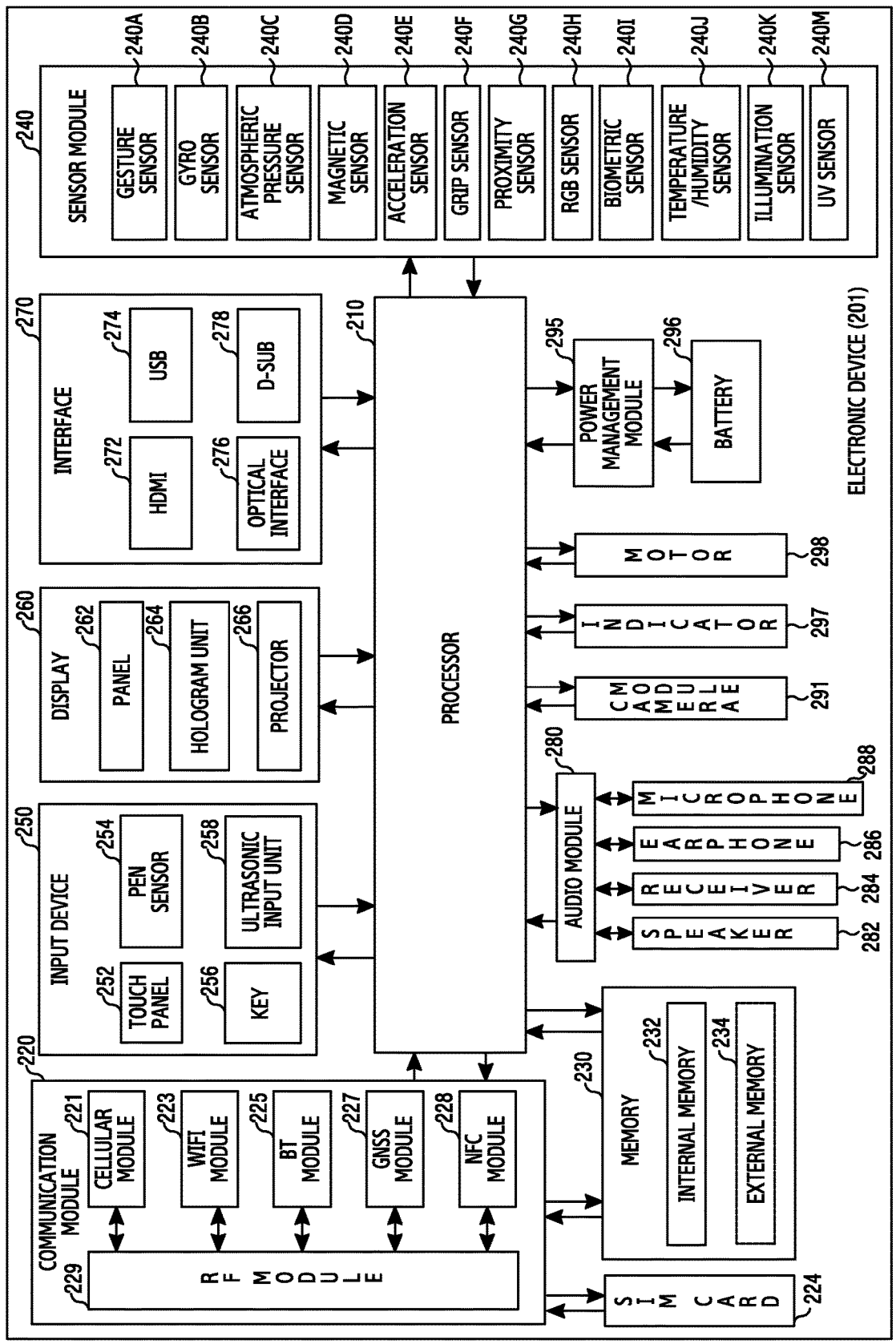
FIG. 2 is a block diagram of an electronic device 201 according to various embodiments of the present disclosure.

FIG. 2 is a block diagram of an electronic device 201 according to various embodiments. The electronic device 201 may include, for example, all or some parts of the electronic device 101 of FIG. 1. The electronic device 201 may include one or more processors (e.g., Application Processors (APs)) 210, a communication module 220, a subscriber identity module 224, a memory 230, a sensor module 240, an input unit 250, a display 260, an interface 270, an audio module 280, a camera unit 291, a power management module 295, a battery 296, an indicator 297, and a motor 298.

The processor 210 may control a plurality of hardware or software components coupled with the processor 210 by driving, for example, an operating system or an application program, and may perform various data processing and computations. The processor 210 may be implemented, for example, with a System on Chip (SoC). According to an embodiment, the processor 210 may further include a Graphic Processing Unit (GPU) and/or an image signal processor. The processor 210 may include at least part (e.g., a cellular module 221) of the aforementioned components of FIG. 2. The processor 210 may process a command or data, which is received from at least one of different components (e.g., a non-volatile memory), by loading it to a volatile memory and may store a variety of data in the non-volatile memory.

The communication module 220 may have the same or similar structure of the communication interface 170 of FIG. 1. The communication module 220 may include, for example, the cellular module 221, a WiFi module 223, a BlueTooth (BT) module 225, a GNSS module 227, a Near Field Communication (NFC) module 228, and a Radio Frequency (RF) module 229.

The cellular module 221 may provide a voice call, a video call, a text service, an Internet service, or the like, for example, through a communication network. According to an embodiment, the cellular module 221 may identify and authenticate the electronic device 201 in the communication network by using a subscriber identity module (e.g., a SIM card 224). According to an embodiment, the cellular module 221 may perform at least some functions that can be provided by the AP 210. According to an embodiment, the cellular module 221 may include a Communication Processor (CP).

Each of the WiFi module 223, the BT module 225, the GPS module 227, and the NFC module 228 may include, for example, a processor for processing data transmitted/received through a corresponding module. According to some embodiments, at least some (e.g., two or more) of the cellular module 221, the WiFi module 223, the BT module 225, the GPS module 227, and the NFC module 228 may be included in one Integrated Chip (IC) or IC package.

The RF module 229 may transmit/receive, for example, a communication signal (e.g., a Radio Frequency (RF) signal). The RF module 229 may include, for example, a transceiver, a Power Amp Module (PAM), a frequency filter, a Low Noise Amplifier (LNA), an antenna, or the like. According to another embodiment, at least one of the cellular module 221, the WiFi module 223, the BT module 225, the GPS module 227, and the NFC module 228 may transmit/receive an RF signal via a separate RF module.

The SIM card 224 may include, for example, a card including a SIM and/or an embedded SIM, and may include unique identification information (e.g., an Integrated Circuit Card IDentifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard drive, or a Solid State Drive (SSD)).

The external memory 234 may further include a flash drive, for example, Compact Flash (CF), Secure Digital (SD), Micro Secure Digital (Micro-SD), Mini Secure digital (Mini-SD), extreme Digital (xD), memory stick, or the like. The external memory 234 may be operatively and/or physically coupled with the electronic device 201 via various interfaces.

The sensor module 240 may measure, for example, physical quantity or detect an operational status of the electronic device 201, and may convert the measured or detected information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternatively, the sensor module 240 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor. The sensor module 240 may further include a control circuit for controlling at least one or more sensors included therein. In some embodiments, the electronic device 201 may further include a processor configured to control the sensor module 204 either separately or as a part of the AP 210, and may control the sensor module 240 while the AP 210 is in a sleep state.

The input device 250 may include, for example, a touch panel 252, a (digital) pen sensor 254, a key 256, or an ultrasonic input unit 258. The touch panel 252 may recognize a touch input, for example, by using at least one of an electrostatic type, a pressure-sensitive type, and an ultrasonic type. The touch panel 252 may further include a control circuit. The touch penal 252 may further include a tactile layer and thus may provide the user with a tactile reaction.

The (digital) pen sensor 254 may be implemented, for example, by using the same or similar method of receiving a touch input of the user or by using an additional sheet for recognition. The key 256 may be, for example, a physical button, an optical key, a keypad, or a touch key. The ultrasonic input unit 258 may use a microphone (e.g., the microphone 288) to sense an ultrasonic wave generated in an input means, and may identify data corresponding to the sensed ultrasonic wave.

The display 260 (e.g., the display 160) may include a panel 262, a hologram 264, or a projector 266. The panel 262 may include the same or similar structure of the display 160 of FIG. 1. The panel 262 may be implemented, for example, in a flexible, transparent, or wearable manner. The panel 262 may be constructed as one module with the touch panel 252. The hologram 264 may use an interference of light and show a stereoscopic image in the air. The projector 266 may display an image by projecting a light beam onto a screen. The screen may be located, for example, inside or outside the electronic device 201. According to an embodiment, the display 260 may further include a control circuit for controlling the panel 262, the hologram 264, or the projector 266.

The interface 270 may include, for example, a High-Definition Multimedia Interface (HDMI) 272, a Universal Serial Bus (USB) 274, an optical communication interface 276, or a D-subminiature (D-sub) 278. The interface 270 may be included, for example, in the communication interface 170 of FIG. 1. Additionally or alternatively, the interface 270 may include, for example, a Mobile High-definition Link (MHL) interface, a Secure Digital (SD)/Multi-Media Card (MMC) interface, or an Infrared Data Association (IrDA) standard interface.

The audio module 280 may bilaterally convert, for example, a sound and electric signal. At least some components of the audio module 208 may be included in, for example, the input/output interface 150 of FIG. 1. The audio module 280 may convert sound information which is input or output, for example, through a speaker 282, a receiver 284, an earphone 286, the microphone 288, or the like.

The camera module 291 is, for example, a device for image and video capturing, and according to an embodiment, may include one or more image sensors (e.g., a front sensor or a rear sensor), a lens, an Image Signal Processor (ISP), or a flash (e.g., LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 296 and voltage, current, and temperature during charging. The battery 296 may include, for example, a rechargeable battery and/or a solar battery.

The indicator 297 may indicate a specific state, for example, a booting state, a message state, a charging state, or the like, of the electronic device 201 or a part thereof (e.g., the AP 210). The motor 298 may convert an electric signal into a mechanical vibration, and may generate a vibration or haptic effect. Although not shown, the electronic device 201 may include a processing unit (e.g., a GPU) for supporting a mobile TV. The processing unit for supporting the mobile TV may process media data according to a protocol of, for example, Digital Multimedia Broadcasting (DMB), Digital Video Broadcasting (DVB), media flow, or the like.

Each of the components described in the present document may consist of one or more components, and names thereof may vary based on a type of electronic device. The electronic device according to various embodiments may include at least one of the aforementioned components. Some of the components may be omitted, or additional other components may be further included. Further, some of the components of the electronic device according to various embodiments may be combined and constructed as one entity, so as to equally perform functions of corresponding components before combination.

Figure 3:
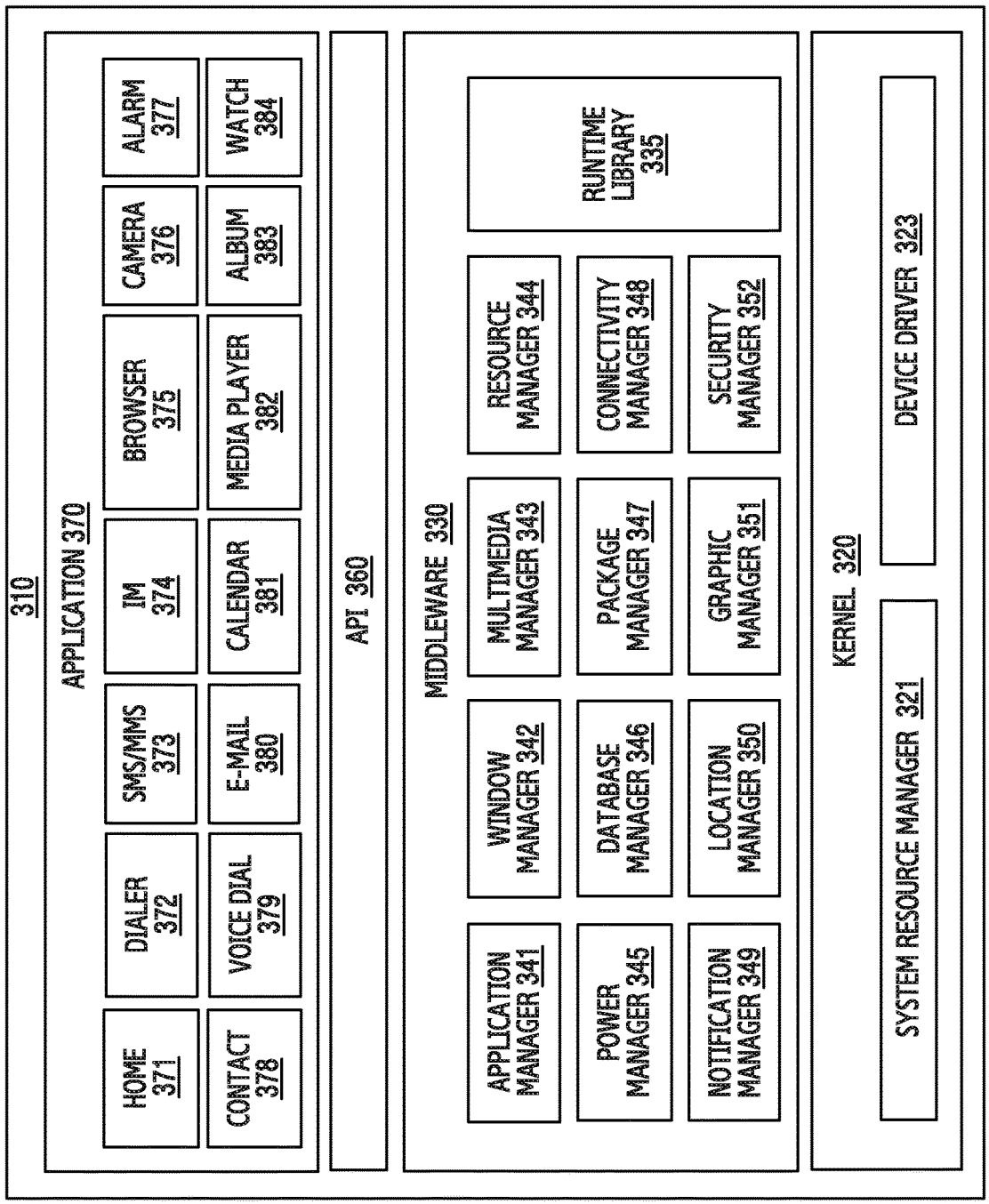
FIG. 3 is a block diagram of a program module according to various embodiments of the present disclosure.

FIG. 3 is a block diagram of a program module according to various embodiments. According to an embodiment, a program module 310 (e.g., the program 140) may include an Operating System (OS) for controlling a resource related to an electronic device (e.g., the electronic device 101) or various applications (e.g., the application 147) driven on the OS. The OS may be, for example, Android, iOS, Windows, Symbian, Tizen, Bada, or the like.

The programming module 310 may include a kernel 320, a middleware 330, an Application Programming Interface (API) 360, and/or an application 370. At least part of the program module 310 can be preloaded on the electronic device, or can be downloaded from an external electronic device (e.g., the electronic devices 102 and 104, the server 106, etc.).

The kernel 320 (e.g., the kernel 141) may include, for example, a system resource manager 321 or a device driver 323. The system resource manager 321 may perform control, allocation, retrieval, or the like of the system resource. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a WiFi driver, an audio driver, or an Inter-Process Communication (IPC) driver.

The middleware 330 may provide, for example, a function commonly required by the application 370, or may provide various functions through the API 360 so that the application 370 can effectively use a limited system resource in the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the application 370 is executed. The runtime library 335 may perform an operation of an input/output management, a memory management, an arithmetic function, or the like.

The application manager 341 may manage, for example, a life cycle of at least one application among the applications 370. The window manager 342 may manage a Graphic User Interface (GUI) resource used in a screen. The multimedia manager 343 may recognize a format required to reproduce various media files, and may use a codec suitable for the format to perform encoding or decoding of the media file. The resource manager 344 may manage a resource (e.g., a source code, a memory, a storage space, etc.) of at least any one of the applications 370.

The power manager 345 may manage, for example, a battery or power by operating together with a Basic Input/Output System (BIOS), or the like, and may provide power information or the like required for the operation. The database manager 346 may manage to generate, search, or change a database to be used in at least one application among the applications 370. The package manager 347 may manage an installation or update of an application distributed in a form of a package file.

The connectivity manager 348 may manage, for example, a wireless connection such as WiFi, Bluetooth, or the like. The notification manager 349 may display or notify an event such as an incoming message, an appointment, a proximity notification, or the like, in a manner of not disturbing the user. The location manager 350 may manage location information of the electronic device. The graphic manager 351 may manage a graphic effect to be provided to the user or a user interface related thereto. The security manager 352 may provide a general security function required for system security, user authentication, or the like. According to an embodiment, if the electronic device (e.g., the electronic device 101) includes a telephone function, the middleware 330 may further include a telephony manager for managing a voice or video telephony function of the electronic device.

The middleware 330 may include a middleware module for forming a combination of various functions of the aforementioned components. The middleware 330 may provide a module specified for each type of operating system to provide a differentiated function. Further, the middleware 330 may dynamically delete some of the existing components or may add new components.

The API 360 (e.g., the API 145) is, for example, a set of API programming functions, and may be provided with other configurations according to an operating system. For example, in case of Android or IOS, one API set may be provided for each platform, and in case of Tizen, two or more API sets may be provided.

The application 370 (e.g., the application program 147) may include one or more applications capable of providing a function of, for example, a home 371, a dialer 372, a Short Message Service (SMS)/Multimedia Messaging Service (MIMS) 373, an Instant Message (IM) 374, a browser 375, a camera 376, an alarm 377, a contact 378, a voice dial 379, an e-mail 380, a calendar 381, a media player 382, an album 383, a clock 384, a health care (e.g., an application for measuring a physical activity level, a blood sugar level, etc.), or providing of environment information (e.g., providing of atmospheric pressure, humidity, or temperature information).

According to an embodiment, the application 370 may include an application (for convenience of explanation, hereinafter, referred to as an "information exchange application") for supporting information exchange between the electronic device (e.g., the electronic device 101) and an external electronic device (e.g., the electronic device 102 or 104). The information exchange application may include, for example, a notification relay application for relaying specific information to the external electronic device or a device management application for managing the external electronic device.

For example, the notification relay application may include a function of relaying notification information generated in another application (e.g., an SMS/MMS application, an e-mail application, a health care application, an environment information application, etc.) of the electronic device to the external electronic device (e.g., the electronic device 202 or 204). Further, the notification relay application may receive notification information, for example, from the external electronic device and may provide it to the user.

The device management application may manage (e.g., install, delete, or update), for example, at least one function (e.g., turning on/turning off the external electronic device itself (or some components thereof) or adjusting of a display illumination (or a resolution)) of an external electronic device (e.g., the electronic device 104) which communicates with the electronic device, an application which operates in the external electronic device, or a service (e.g., a call service or a message service) provided by the external electronic device.

According to an embodiment, the application 370 may include an application specified according to an attribute (e.g., as an attribute of the electronic device, a type of the electronic device is a mobile medical device) of the external electronic device (e.g., the electronic device 102 or 104). According to an embodiment, the application 370 may include an application received from the external electronic device (e.g., the server 106 or the electronic device 102 or 104). According to an embodiment, the application 370 (e.g., the application 134) may include a preloaded application or a third party application that can be downloaded from the server. A name of components of the program module 310 according to the illustrated embodiment may differ based on an OS type.

According to various embodiments, at least a part of the program module 310 may be implemented in software, firmware, hardware, or at least two or more of combinations thereof. At least some parts of the programming module 310 may be implemented (e.g., executed), for example, by a processor (e.g., the AP 210). At least some parts of the programming module 310 may include, for example, modules, programs, routines, sets of instructions, processes, or the like for performing one or more functions.

A term "module" used in the present document may imply a unit including, for example, one of hardware, software, and firmware or a combination of two or more of them. The "module" may be interchangeably used with a term such as a unit, a logic, a logical block, a component, a circuit, or the like. The "module" may be a minimum unit of an integrally constituted component or may be a part thereof. The "module" may be a minimum unit for performing one or more functions or may be a part thereof. The "module" may be mechanically or electrically implemented. For example, the "module" of the present disclosure may include at least one of an each application Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or method (e.g., operations) according to various embodiments may be implemented with an instruction stored in a computer-readable storage media. If the instruction is executed by one or more processors (e.g., the processor 120), the one or more processors may perform a function corresponding to the instruction. The computer-readable storage media may be, for example, the memory 130.

The computer readable recording medium may include a hard disk, a floppy disk, magnetic media (e.g., a magnetic tape), optical media (e.g., a Compact Disc-ROM (CD-ROM), a Digital Versatile Disc (DVD), magnetic-optic media (e.g., a floptical disk)), a hardware device (e.g., a Read Only Memory (ROM), a Random Access Memory (RAM), a flash memory, or the like), or the like. An example of the program instruction includes not only a machine language created by a compiler but also a high-level language executable by a computer by using an interpreter or the like. The aforementioned hardware device may be configured to operate as one or more software modules to perform the operation of various exemplary embodiments, and the other way around is also possible.

The module or programming module according to various embodiments may further include at least one or more components among the aforementioned components, or may omit some of them, or may further include additional other components. Operations performed by a module, programming module, or other components according to various embodiments may be executed in a sequential, parallel, repetitive, or heuristic manner. Further, some of the operations may be executed in a different order or may be omitted, or other operations may be added. In addition, an embodiment disclosure in the present document is provided for explaining and understanding technical features, not for limiting the scope of the technique described in the present document. Therefore, all changes based on the technical features of the present document or various other embodiments will be construed as being included in the scope of the present document.

Figure 4A:
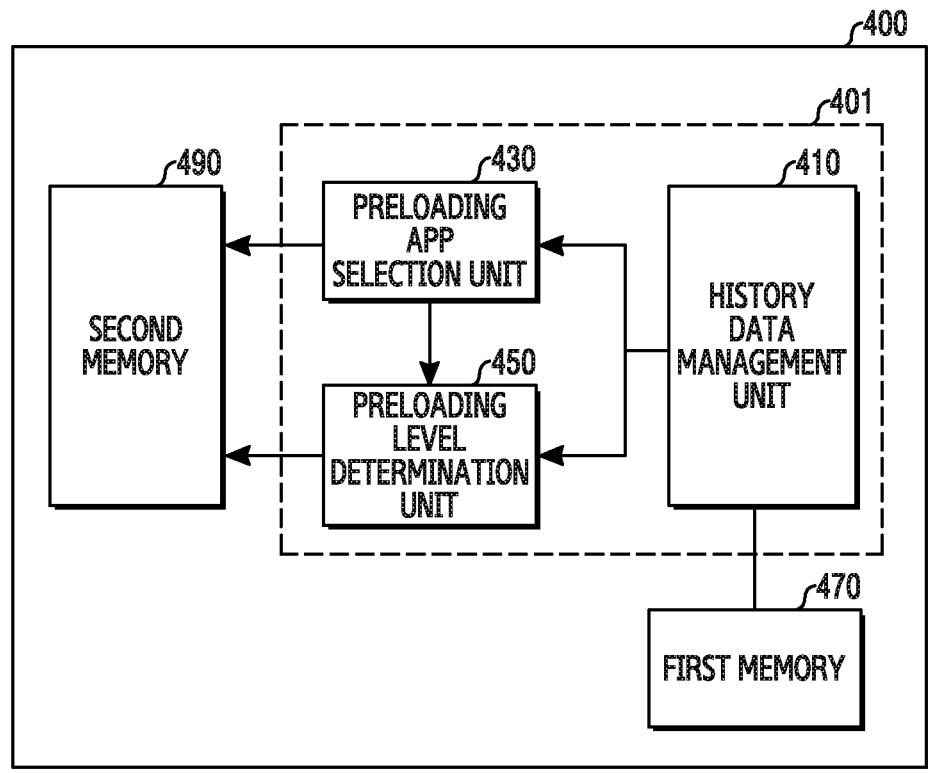
FIG. 4A illustrates a structure of an electronic device 400 according to an embodiment of the present disclosure.

FIG. 4A illustrates a structure of an electronic device 400 according to an embodiment of the present disclosure. Hereinafter, the term ' . . . unit', ' . . . device', or the like implies a unit of processing at least one function or operation, and may be implemented in hardware or software or in combination of the hardware and the software.

For example, the electronic device 400 may fully or partially correspond to the electronic device 101 of FIG. 1. The electronic device 400 may include a history data management unit 410, a preloading APP selection unit 430, and a preloading level determination unit 450. A processor 401 may include the history data management unit 410, the preloading APP selection unit 430, and the preloading level determination unit 450. The electronic device 400 may further include a first memory 470 and a second memory 490.

The first memory 470 may have a non-volatile memory characteristic. That is, even if the electronic device is rebooted, data stored in the first memory 470 may remain before rebooting. The first memory 470 may be used as a recording space of applications installed in the electronic device 400. That is, the first memory 470 may store the applications. In addition, the electronic device 400 may maintain and manage data regarding an accumulated execution count and launching speed of an application to be executed, by storing the data in the first memory 470.

The second memory 490 may have a volatile memory characteristic. That is, if the electronic device is rebooted, a task loaded through the second memory 490 may not be stored by the electronic device 400. If it is intended to execute one of applications stored in the first memory 470, the application may be loaded to the second memory 490. Specifically, a layout, image, library, or the like of the application may be loaded via the second memory 490 to execute the application. In this case, according to various embodiments of the present disclosure, the application may be preloaded to the second memory 490 before an execution command occurs.

According to an embodiment, the electronic device 400 may preload a preloading target application selected by the preloading APP selection unit 430 via the second memory 490. According to another embodiment, the preloading level determination unit 450 of the electronic device 400 determines a preloading level with respect to the preloading target application selected by the pre-loading APP selecting unit 430, and thereafter preloads an application by considering the level in a stepwise manner. According to another embodiment, the electronic device 400 may skip the selection for the preloading target application and determine the preloading level via the preloading level determination unit 450 for all applications of the electronic device. In addition, the electronic device 400 may preload the application in a stepwise manner by considering the determined level.

A method of operating each element will be described below in detail. The history data management unit 410 included in the processor 401 may determine a score $S_{APP}$ by considering an execution count and launching time of an application to be executed in the electronic device 400. The execution count of the application may include a total accumulated execution count or an application accumulated execution count during a specific time (duration). In addition, if an external device is coupled with the electronic device 400, the history data management unit 410 may determine a store $S_{device}$ by additionally considering a total accumulated execution count of an application to be executed in a state where the external device is coupled or an accumulated execution count during a specific time (duration). An application launching time may be defined as a time required until a specific application is executed after an execution command of the application is input by a user via an input interface. For example, the score may be high if the application has a great execution count and a long launching time. The history data management unit 410 may store the score in the first memory 470. In addition, the history data management unit 410 may maintain and update the score by considering a time elapse. The history data management unit 410 may provide the score to the preloading APP selection unit 430 in order to select a preloading application. In addition, the history data management unit 410 may also provide the score to the preloading level determination unit 450 to determine the preloading level.

Figure 4B:
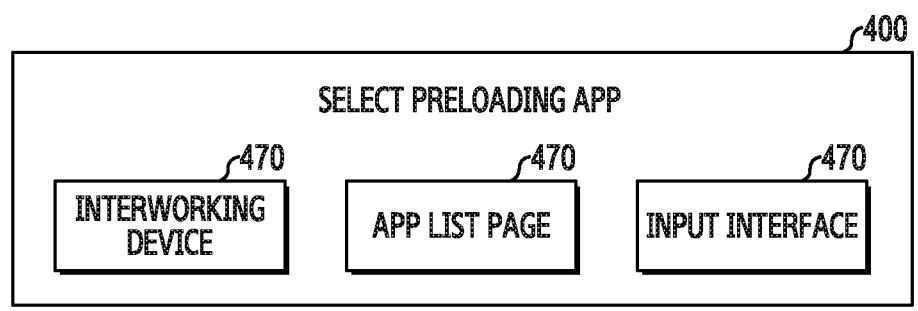
FIG. 4B illustrates a criterion of selecting a preloading application according to an embodiment of the present disclosure.

The preloading APP selection unit 430 may select the preloading target application based on the score provided from the history data management unit 410. According to other embodiments of the present disclosure, the preloading APP selection unit 430 may determine the preloading target application by considering various situations. FIG. 4B illustrates three requirements for selecting a preloading application. For example, the preloading APP selection unit 430 may select a preloading target application by considering a case where an external device is coupled. Alternatively, the preloading APP selection unit 430 may select the preloading target application by considering an attribute of a page displayed on the electronic device 400. Alternatively, the preloading APP selection unit 430 may select the preloading target application based on a cursor movement. Alternatively, the preloading APP selection unit 430 may select the preloading target application based on a computation amount of a CPU. Alternatively, the preloading APP selection unit 430 may detect a user input through a touch panel, distinguish a user touch input based on a pressing sensitivity and time, and select the preloading target application based on the distinguished user touch input.

For example, it may be assumed a case where the external device is coupled with the electronic device 400. In this case, the preloading APP selection unit 430 may select the preloading target application based on the $S_{device}$ provided from the history data management unit 410.

As another example, the preloading APP selection unit 430 may select the preloading target application by using the $S_{APP}$ and the page attribute of the electronic device 400. The page attribute may be distinguished according to whether it is currently displayed via the electronic device 400. The page means a space for displaying icons for executing the application. Although multiple pages may exist, the electronic device 400 may display only a limited number of pages at the same time. In this case, since this is a state where an application corresponding to icons included in the page being displayed can be selected by a user, the application is more likely to be executed. Therefore, the application corresponding to the icons included in the page being displayed is preferably selected as a preloading application. Hereinafter, for convenience of explanation, a page being displayed is referred to as a 'displayed page', and a page not being displayed but being hidden is referred to as a 'hidden page'. Alternatively, the displayed page may be referred to as a 'visible page', and the hidden page may be referred to as a 'side page'. Herein, it may be meaningful to have an attribute in a page located at both sides of the page being displayed among the hidden pages, but having the attribute may not be significantly meaningful to the other pages. Therefore, the hidden page mentioned through the present specification described below is for illustrative purposes only, and the embodiment is not limited thereto. Thus, the hidden page may represent a page at both sides of the displayed page. As described above, a priority of a page attribute may be higher in the displayed page than in the hidden page since a user is more likely to execute the application on the displayed page. Specifically, the preloading APP selection unit 430 may select top N applications having a high $S_{APP}$ as preloading target applications among applications located on the displayed page. In addition, the preloading APP selection unit 430 may select top M applications having a high $S_{APP}$ as the preloading target applications among applications located on the hidden page. Herein, in general, N may be greater than M. In addition, the N applications and the M applications may be managed as a preloading target list. Herein, the N applications corresponding to the displayed page may have a higher list order than the M applications corresponding to the hidden page. The preloading APP selection unit 430 may change the preloading target list in the electronic device 400 by considering a case where the displayed page changes.

The preloading level determination unit 450 may determine a preloading level with respect to an application selected by the preloading APP selection unit 430. Specifically, the preloading level determination unit 450 may be provided with a preloading selection target application from the preloading APP selection unit 430. In addition, the preloading level determination unit 450 may be provided with the $S_{APP}$ and $S_{device}$ from the history data management unit 410. The preloading level determination unit 450 may determine a state of the electronic device, that is, a weight W of the electronic device 400 by considering a free memory ratio and a CPU load of the second memory 490. According to an embodiment, the preloading level determination unit 450 may determine a preloading level by multiplying the weight W determined by considering the state of the electronic device and the score provided from the history data management unit 430. For example, if the external device is not coupled with the electronic device, the preloading level of the application may be determined by a product of the $S_{APP}$ and the W. Alternatively, if the external device is coupled with the electronic device 400, the preloading level of the application may be determined by a product of the $S_{device}$ and the W. The value W may be in the range of 0 to 1, which represents a current state of the electronic device 400 in percentage (%).

The present disclosure relates to preloading of an application by predicting a usage of a user's application. In this case, the preloading application may be selected using the prediction according to the following three patterns. FIGS. 6 to 11, 12A, and 12B illustrate an apparatus and method for selecting a preloading application by considering the three patterns.

Figure 5:
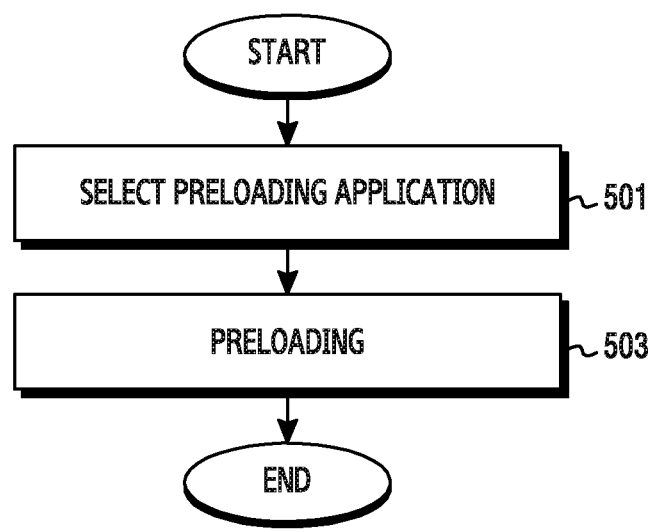
FIG. 5 is a flowchart illustrating an operation of selecting and preloading a preloading application according to an embodiment of the present disclosure.

FIG. 5 is a flowchart illustrating an operation of selecting and preloading a preloading application according to an embodiment of the present disclosure.

In operation 501, the electronic device 400 may select a preloading target by considering an application usage pattern of a user. The preloading target is determined by a score for each application. The score may be determined based on a launching count and launching time of applications.

According to an embodiment, if the external device is coupled with the electronic device 400, at least one preloading target application may be selected based on the $S_{device}$. Herein, the $S_{device}$ may be determined based on the accumulated launching count and launching time of the application executed in a state where the external electronic device is coupled with the electronic device 400. Alternatively, the $S_{device}$ may be determined based on the accumulated launching count and launching time of the application during a specific period of time in order to consider the application usage pattern of a recent user. A specific number of applications having a high $S_{device}$ may be selected as the preloading target by considering the state of the electronic device 400.

According to another embodiment, the electronic device 400 may select the preloading application based on an APP list page. If the user selects an application to be executed, it is displayed as an icon on a screen. This page may be defined as the APP list page. The APP list page is at least one page, and may usually include several pages. If it is assumed that the APP list page has several pages, an attribute may be defined such that a page viewed through the display unit of the current electronic device 400 is a displayed page, and a page at both sides of the displayed page is a hidden page. The remaining other pages may not have attributes. In general, since the user is highly likely to execute an application located on the displayed page, the display page may have a higher priority of the page attribute than the hidden page. The selection of the preloading application may be determined by considering an accumulated launching count and launching time score, that is, an APP score (hereinafter, '$S_{APP}$') of applications located on respective pages. Alternatively, the $S_{APP}$ may be determined based on the accumulated launching count and launching time of the application during a specific period of time to consider a recent application usage pattern of the user. The electronic device 400 may select an application having a high $S_{APP}$ provided by the history data management unit 410. However, since an attribute of each page has a different priority, the number of preloading applications selected for each attribute may be applied differently, and the number may be expressed by a parameter and may be applied flexibly according to a specification of a terminal. In addition, a time of staying on a corresponding page may be counted to select a preloading application in case of staying more than a specific time 'T'.

According to another embodiment, the electronic device 400 may select a preloading target application in accordance with an input interface. The electronic device 400 may detect a new application input at a location of a cursor controlled based on an input interface. Herein, the new application is an application which has not yet been preloaded. The cursor may include a mouse point, a point of a smart pen, or the like. The cursor may be controlled through the mouse, the smart pen, or the like to input a user command for the electronic device 400. The electronic device 400 may determine a preloading wait time 'T'. Herein, the preloading wait time T means a wait time for preloading an application indicated by the cursor. The preloading wait time T may be determined by referring to the $S_{APP}$ from the history data management unit of a corresponding application. For example, the greater the $S_{APP}$, the shorter the preloading wait time T may be set. That is, the preloading wait time T may vary based on the application. After the preloading wait time T of the application is determined, the electronic device 400 may determine whether a time for which the curser stays in a specific application is greater than or equal to the preloading wait time 'T'. If the time for which the curser stays in an application is less than the preloading wait time T of the application, the application may not be preloaded. Otherwise, if the time for which the cursor stays in the application is greater than the preloading wait time T, the electronic device 400 may select the application as a preloading target. Accordingly, the electronic device 400 may preload the application.

If at least one preloading target application is selected by the above three factors, in operation 503, the electronic device 400 may preload the application. However, optionally, if the preloading application is already preloaded by the second memory 490, it may be excluded from a preloading selection target.

Figure 6:
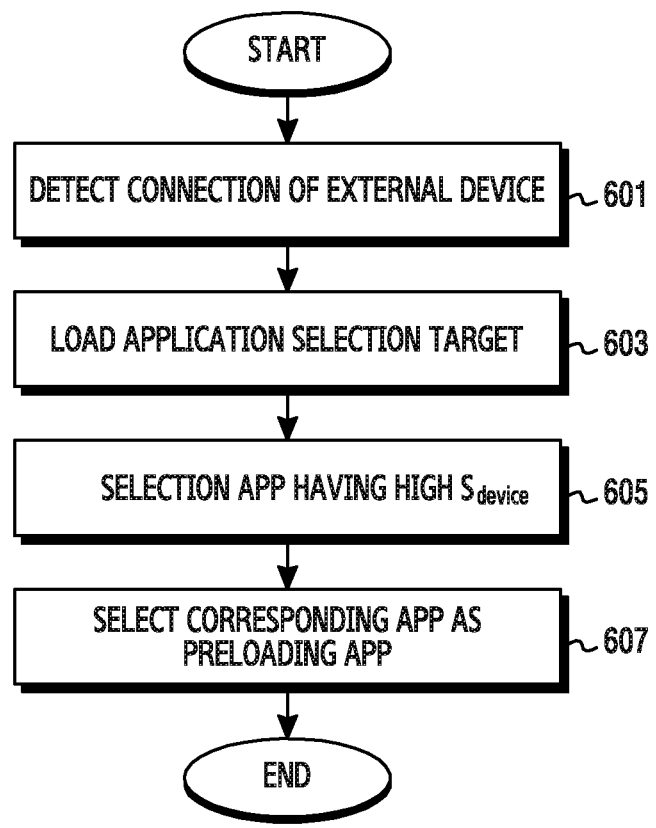
FIG. 6 is a flowchart illustrating an operation of selecting a preloading application based on interworking with an external device according to an embodiment of the present disclosure.

FIG. 6 is a flowchart illustrating an operation of selecting a preloading application based on interworking with an external device according to an embodiment of the present disclosure. The electronic device 400 to which smart platform is applied may be used in association with the external device. The electronic device 400 to which the smart platform is applied may be used in association with a wearable device used in a form of glasses, a clock, or the like, and Internet of things (IoT). In this case, an application which uses various built-in sensors (accelerometer, GPS, proximity sensor, camera, etc.) may be used. For example, the electronic device 400 to which the smart platform is applied may be coupled with the external device by using Bluetooth, Wi-Fi, wired communication such as HDMI, infrared communication, or the like. In addition, the electronic device 400 may be directly retrieved from the electronic device 400, or may be easily coupled with the external device by using a dedicated application. In this case, a launching count and launching time of an application used for each coupled external device may be recorded in the history data management unit 410. In addition, the launching count and launching time of the application may be utilized in the selection of the preloading application. A pattern used in the above method is not an accumulated launching count of an overall application of the electronic device 400. That is, based on an external device's type and coupling mechanism, the accumulated launching count of the application may be considered as a user pattern while the external device is coupled. Therefore, the $S_{device}$ may be managed separately from a general launching count and launching time of the electronic device 400.

A specific operation method is as follows. If the external device is coupled with the electronic device 400, in operation 601, the electronic device 400 may detect an external device to be coupled. Specifically, the electronic device 400 may detect a type (e.g., clock, glasses, etc.) of the external device to be coupled and a coupling mechanism (e.g., Bluetooth, WiFi, etc.). If the external device to be coupled with the electronic device 400 is detected, the electronic device 400 may generate a sensing event.

If the sensing event occurs, in operation 603, the electronic device 400 may load a selection target of a preloading application. The selection target may be managed based on the type of the external device and a managed user pattern. A case where the coupled external device is a wearable device such as a clock or the like may be assumed according to an embodiment. If the wearable device is coupled, specific applications may be primarily used in the electronic device 400, and a used specific application may be managed as an application selection target of the external device. The selection target may be maintained and updated with history data, and the history data may be stored in the first memory 470 of the electronic device 400.

After the selection target based on the coupled external device is loaded, in operation 605, the electronic device may select an application having a high $S_{device}$ among the selection targets as a preloading target. Specifically, the $S_{device}$ may be determined based on an accumulated launching count and launching speed for the specific application while the coupled external device is coupled with the electronic device 400. For example, while a wearable device such as a watch or the like is coupled with the electronic device 400, the higher the accumulated launching count of the specific application, the higher the $S_{device}$ may be. The accumulated launching count may be counted based on a specific duration for the purpose of applying a recent user pattern. For example, the accumulated launching count of the specific application may be counted based one week or one month. In addition, for example, the slower the launching speed of the specific application, the higher the $S_{device}$ may be. In the selecting of the application having the high $S_{device}$ as the preloading target, the number of applications to be preloaded may vary based on a user configuration and a state of the electronic device 400. For example, the number of applications to be preloaded may be limited to a specific number or less based on the user configuration. In addition, the number of applications to be preloaded according to the state of the electronic device 400, that is, a load of a CPU and the second memory 490, may be limited to a specific number or less.

If K applications having a high $S_{device}$ are selected, in operation 607, the electronic device 400 may determine the selected K applications as the preloading application. However, if a connection with an external device is disconnected while an application selected as a preloading target is not executed after being preloaded according to an embodiment, the preloaded application may be task-killed to increase efficiency of memory management.

Although not shown in FIG. 4A, the electronic device may further include a display unit capable of displaying various information via a screen. If the user selects an application to be executed, it is displayed as an icon on the screen. This page may be defined as the APP list page. The APP list page is at least one page, and may usually include several pages. If it is assumed that the APP list page has several pages, an attribute may be defined such that a page viewed through the display unit of the current electronic device 400 is a displayed page, and a page at both sides of the displayed page is a hidden page. The remaining other pages may not have attributes. In general, since the user is highly likely to execute an application located on the displayed page, the display page may have a higher priority of the page attribute than the hidden page. The selection of the preloading application may be determined by considering an accumulated launching count and launching time score, that is, an APP score (hereinafter, '$S_{APP}$') of applications located on respective pages. The electronic device 400 may select an application having a high $S_{APP}$ provided by the history data management unit 410. However, since an attribute of each page has a different priority, the number of preloading applications selected for each attribute may be applied differently, and the number may be expressed by a parameter and may be changed flexibly according to a specification of a terminal. In addition, a time of staying on a corresponding page may be counted to select a preloading application in case of staying more than a specific time 'T'. As a simple example rather than a limitation of the embodiment, the preloading application may be selected if it stays on the APP list page for at least 2 seconds. Since a plurality of applications may be selected, the application may be managed with a list and then are inserted to a queue to perform preloading sequentially thereon. A specific operating method is as follows.

Figure 7:
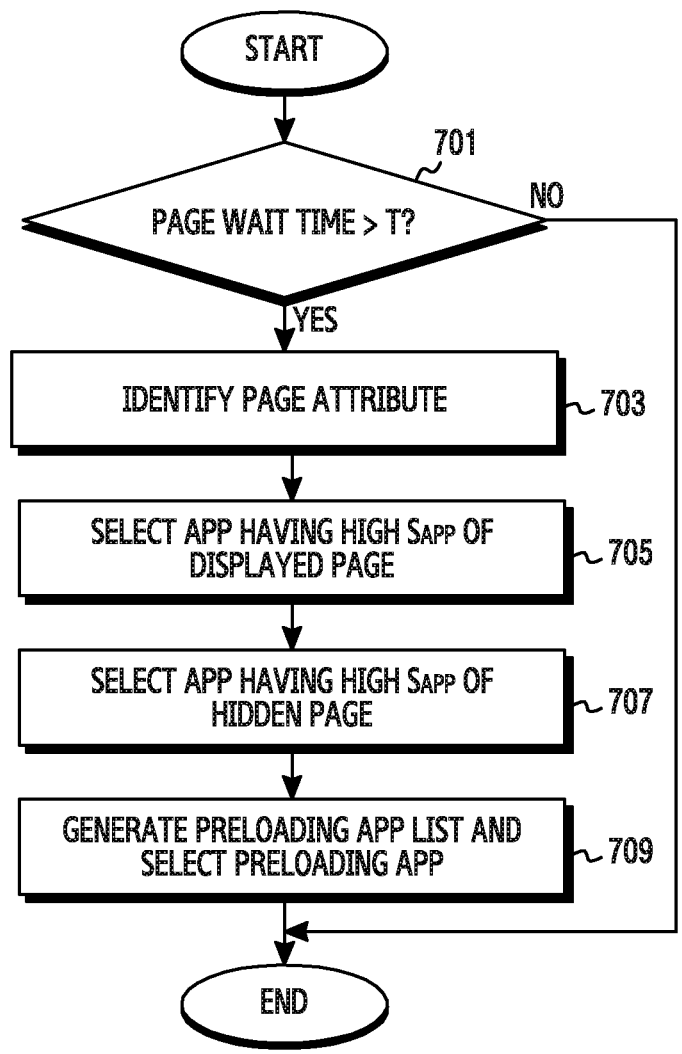
FIG. 7 is a flowchart illustrating an operation of selecting a preloading application based on an APP list page according to an embodiment of the present disclosure.

FIG. 7 is a flowchart illustrating an operation of selecting a preloading application based on an APP list page according to an embodiment of the present disclosure.

In operation 701, the electronic device 400 may determine a time of staying on an APP list page displayed through the display unit of the electronic device 400. For example, it may be determined whether the time of staying on the APP list page is greater than or equal to a specific time 'T'. This is because, if the time of staying on the APP list page is very short, it may be determined that the user of the electronic device 400 has no intention to execute the application arranged on the APP list page.

If the time of staying on the APP list page is greater than or equal to 'T', in operation 703, the electronic device 400 may identify a page attribute. Specifically, the electronic device 400 may distinguish the displayed page and the hidden page. In addition, $S_{APP}$s of applications arranged on each page may be identified through history data stored in the first memory 470 of the electronic device 400. The $S_{APP}$ may be determined by considering an accumulated launching count and launching time of the application. For example, the greater the accumulated launching count of a specific application and the longer the launching time, the greater the $S_{APP}$ may be. In addition, the $S_{APP}$ stored in the history data may be maintained or updated according to a time flow. Alternatively, if an external device is coupled, the electronic device 400 may identify $S_{device}$ of the applications arranged on the APP list page.

In operation 705, the electronic device 400 selects at least one application having a high $S_{APP}$ (or $S_{device}$) on the displayed page. For example, the electronic device 400 may select top N applications having the high $S_{APP}$ (or $S_{device}$). Herein, N may be a fixed value, or may be a value which varies based on a state.

In operation 707, the electronic device 400 may select at least one application having the highest $S_{APP}$ (or $S_{device}$). For example, the electronic device 400 may select top M applications having the highest $S_{APP}$ (or $S_{device}$). Herein, M may be a fixed value, or may be a value which varies based on a state. In addition, M and N may be set to identical or different values.

In addition, in operation 709, the electronic device 400 may create a list for N applications corresponding to the displayed page and M applications corresponding to the hidden page. However, an application which has already been preloaded may be excluded from the list. Herein, N and M may vary based on a state of the electronic device 400. In general, a list of the N applications corresponding to the displayed page may have a higher order than a list of M applications corresponding to the hidden page. According to a determined list order, the top N applications corresponding to the displayed page may be preloaded with a higher priority than the top M applications corresponding to the hidden page.

If the displayed page is changed based on a user's input or a state change of the electronic device 400, a preloading application may be re-selected by repeating the above process. In this process, an application which is excluded from the preloading target according to a change in the displayed page among previous preloading target applications may be task-killed for memory efficiency.

Figure 8:
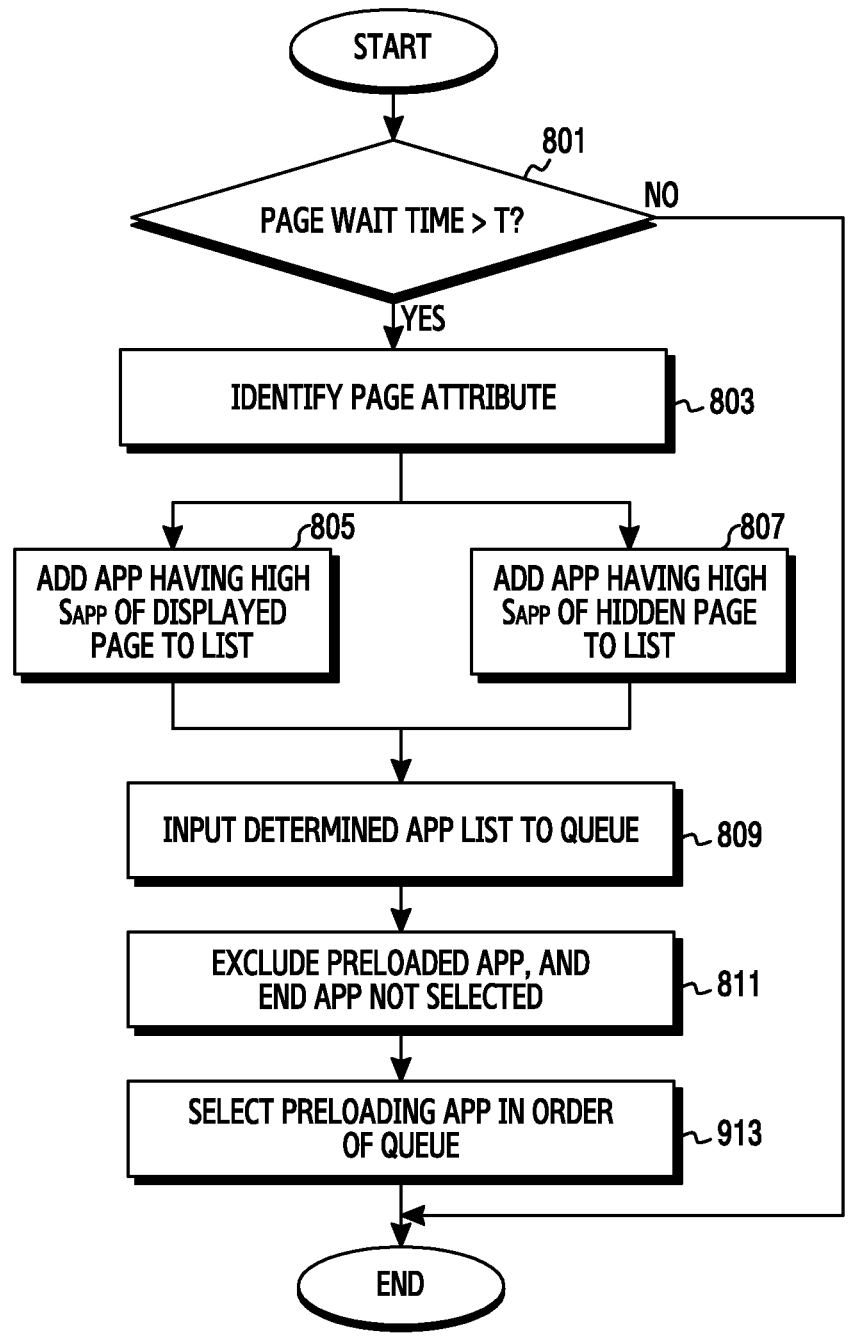
FIG. 8 is a detailed flowchart illustrating an operation of selecting a preloading application based on an APP list page according to an embodiment of the present disclosure.

FIG. 8 is a detailed flowchart illustrating an operation of selecting a preloading application based on an APP list page according to an embodiment of the present disclosure. Although not shown in FIG. 4A, the electronic device may further include a display unit capable of displaying various information via a screen. If the user selects an application to be executed, it is displayed as an icon on the screen. This page may be defined as the APP list page. The APP list page is at least one page, and may usually include several pages. If it is assumed that the APP list page has several pages, an attribute may be defined such that a page viewed through the display unit of the current electronic device 400 is a displayed page, and a page at both sides of the displayed page is a hidden page. The remaining other pages may not have attributes. For example, in general, since the user is highly likely to execute an application located on the displayed page, the display page may have a higher priority of the page attribute than the hidden page. The selection of the preloading application may be determined by considering an accumulated launching count and launching time score, that is, an APP score (hereinafter, '$S_{APP}$') of applications located on respective pages. The electronic device 400 may select an application having a high $S_{APP}$ provided by the history data management unit 410. Alternatively, if an external device is coupled, the electronic device 400 may identify $S_{device}$ of the applications arranged on the APP list page. In this case, the electronic device 400 may select an application having a high $S_{device}$. However, since an attribute of each page has a different priority, the number of preloading applications selected for each attribute may be applied differently, and the number may be expressed by a parameter and may be changed flexibly according to a specification of a terminal. In addition, a time of staying on a corresponding page may be counted to select a preloading application in case of staying more than a specific time 'T'. Since a plurality of applications may be selected, the application may be managed with a list and then are inserted to a queue to perform preloading sequentially thereon. A specific operating method is as follows.

FIG. 8 is a detailed flowchart illustrating an operation of selecting a preloading application based on an APP list page according to an embodiment of the present disclosure. Although not shown in FIG. 4A, the electronic device may further include a display unit capable of displaying various information via a screen. In operation 801, the electronic device 400 may determine a time of staying on an APP list page. For example, it may be determined whether the time of staying on the APP list page is greater than or equal to a specific time 'T'. This is because, if the time of staying on the APP list page is very short, it may be determined that the user of the electronic device 400 has no intention to execute the application arranged on the APP list page.

If the time of staying on the APP list page is greater than or equal to 'T', in operation 803, the electronic device 400 may identify a page attribute. Specifically, the electronic device 400 may distinguish the displayed page and the hidden page. Herein, an attribute may be defined such that a page viewed through the display unit of the current electronic device 400 is a displayed page, and a page at both sides of the displayed page is a hidden page. The remaining other pages may not have attributes. In addition, $S_{APP}$s of applications arranged on each page may be identified through history data stored in the first memory 470 of the electronic device 400. Alternatively, if an external device is coupled, the electronic device 400 may identify $S_{device}$ of the applications arranged on the APP list page. The $S_{APP}$ (or $S_{device}$) may be determined by considering an accumulated launching count and launching time of the application. For example, the greater the accumulated launching counts of a specific application and the longer the launching time, the greater the $S_{APP}$ ($S_{device}$) may be. In addition, the $S_{APP}$ ($S_{device}$) stored in the history data may be maintained or updated according to a time flow.

In operation 805, the electronic device 400 may select top N applications having a high $S_{APP}$ (or $S_{device}$) for the displayed page. In addition, the N applications may be added to an APP list managed by the history data management unit 410. In operation 807, the electronic device 400 may select the top N applications having the high $S_{APP}$. In addition, the M applications may be added to the APP list managed by the history data management unit 410. Herein, in operation 809, a list of the N applications corresponding to the display page and a list of the M applications corresponding to the hidden page may be input to a queue managed by the history data management unit 410. Herein, the N applications corresponding to the displayed page may have a higher input order than the M applications corresponding to the hidden page.

However, in operation 811, an application which has already been preloaded may be excluded from the APP list. In addition, an application which is not selected as a preloading target due to a change in the displayed page or other reasons may be task-killed.

In operation 813 the electronic device 400 may select a preloading application according to a queue order finally determined in the above process, and may preload the selected application.

FIGS. 9A and 9B illustrate a method of selecting a preloading application based on a change in a displayed page according to an embodiment of the present disclosure. For the purpose of explanation, it is shown in FIGS. 9A and 9B that the number of pages indicating the number of preloading applications for each page attribute is set to 2, and the number of hidden pages is set to 1. However, this is simply for exemplary purposes only and is not a limitation of the embodiment. Therefore, the number of preloading applications for each page attribute may vary based on a user. Alternatively, the number of preloading applications for each page attribute may be automatically changed by considering a state of the electronic device 400.

Referring to FIG. 9A, a case where a page C 915 is a displayed page is shown as an embodiment. In the page C 915, two applications having a greatest accumulated launching count may be an application C(2×4) of which an accumulated launching count is 98 and an application C(3×4) of which an accumulated launching count is 76. Herein, the accumulated launching count may include a total accumulated launching count of the application or an accumulated launching count for a specific duration by commutating inversely from the current time. Therefore, the application C(2×4) and the application C(3×4) may be added to a preloading list. In addition, in a page B 913 and a page D 917, which correspond to hidden pages, applications having the greatest accumulated launching count may be respectively an application B(4×4) and an application D(4×4). Each of the application B(4×5) and the application D(4×4) may be selected and added to the list.

Herein, since an application located on a currently displayed page is more likely to be executed than an application located on a hidden page, the preloading list may be configured in the order of C(2×4), C(3×4), D(4×4), and B(4×5). Herein, for example, a list order between the application C(2×4) and application C(3×4) of the displayed page may be determined by a size of the accumulated launching count. In an embodiment, since the accumulated launching count of the application C(2×4) is 98 and the accumulated launching count of the application C(3×4) is 76, the application C(2×4) may have a higher list order than the application C(3×4). The list order between the application B(4×5) and application D(4×4) of the hidden page may be determined by considering a change in the displayed page. For example, if the displayed page is changed from the page B 913 to the page C 915, the application D(4×4) may be more likely to be executed than the application B(4×5). Therefore, even if the accumulated launching count is smaller, the application D(4×4) may have a higher list order than the application B(4×5). If the list order is determined, the applications may be preloaded after being input to a queue according to the list order.

FIG. 9B illustrates a case where the displayed page is changed from the page C 915 to the page D 917. In this case, an attribute of each page may show that the page D 917 is the displayed page, and the page C 915 and the page E 919 are hidden pages. In this case, a preloading target application may be selected by applying the same criterion as in FIG. 9A. In the page D 917, two applications having the greatest accumulated launching count may be an application D(4×4) of which an accumulated launching count is 54 and an application D(3×3) of which an accumulated launching count is 42. In addition, in the page C 915 and page E 919 corresponding to the hidden pages, applications having the greatest accumulated launching count may be an application C(2×4) and the application E(2×4), respectively. The list order may be configured in the order of D(3×3), D(4×4), E(2×4), and C(4×5) in the same manner as in FIG. 9A. Herein, applications located at D(3×3) and E(2,4) other than preloaded C(2×4) and D(4×4) may be selected and preloaded. In this case, the previously preloaded C(3×4) and B(4×5) may be task-killed since they do not meet a current selection criterion. In the above embodiment, not only the accumulated launching count but also the launching speed of the application may be considered as a criterion for selecting a preloading application.

There are various types of input interfaces used to control the electronic device 400. A terminal may be controlled with a sensor-based input interface (e.g., static electricity of a finger, pen, remote control, etc.) or other various input interfaces (e.g., keyboard, mouse, eye tracking, etc.). If the application of the electronic device 400 is directly executed with the input interface, a preloading application may be selected based on a location (cursor) indicated by a corresponding interface. A method of selecting the preloading application with the input interface is as follows.

Figure 10:
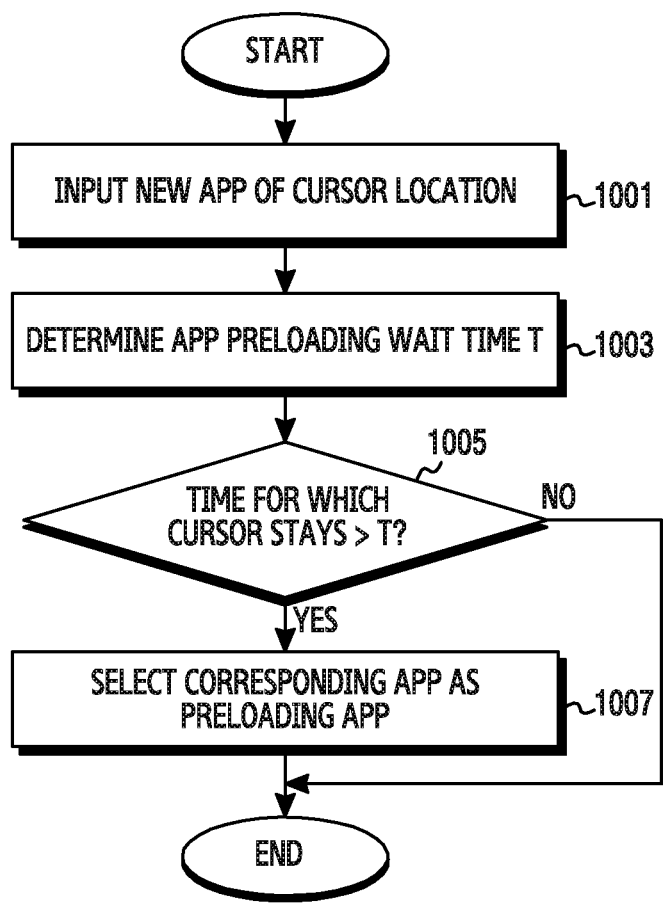
FIG. 10 is a flowchart illustrating an operation of selecting a preloading application based on an input interface according to an embodiment of the present disclosure.

FIG. 10 is a flowchart illustrating an operation of selecting a preloading application based on an input interface according to an embodiment of the present disclosure.

In operation 1001, the electronic device 400 may detect a new application input at a location of a cursor controlled based on an input interface. Herein, the new application is an application which has not yet been preloaded. The cursor may include a mouse point, a point of a smart pen, or the like. The cursor may be controlled through the mouse, the smart pen, or the like to input a user command for the electronic device 400.

Thereafter, in operation 1003, the electronic device 400 may determine a preloading wait time 'T' of the new application. Herein, the preloading wait time 'T' implies a wait time for preloading an application indicated by the cursor. The preloading wait time 'T' may be determined by referring to $S_{APP}$ (or $S_{device}$ if an external device is coupled) from a history data management unit of the application. For example, the greater then $S_{APP}$ (or $S_{device}$), the shorter the preloading wait time T may be.

After the preloading wait time T of the application is determined, in operation 1005, the electronic device 400 may identify whether a time for which the cursor stays in the application is greater than or equal to the preloading wait time. This is because, if the time for which the cursor stays in the application is very short, for example, if the application is simply included in a movement path of the cursor, a user is unlikely to execute the application. If the time for which the cursor stays in the application is shorter than the preloading wait time T, the application may not be preloaded.

Otherwise, if the time for which the cursor stays in the application is longer than the preloading wait time T, in operation 1007, the electronic device 400 selects the application as a preloading target. Accordingly, the electronic device 400 may preload the application.

Additionally, in a case where a specific input interface is used for the first time after the electronic device 400 is booted (switched on), an application having a great accumulated application execution count $S_{interface}$ of the input interface may be selected as the preloading application. The $S_{interface}$ may be determined based on an accumulated execution count and launching time of an application executed while using the specific input interface. Thereafter, a preloading application target may be additionally changed based on a cursor location based on the aforementioned operation. The accumulated application execution count $S_{interface}$ of the input interface may be maintained and updated based on a specific period from the history data management unit.

Figure 11:
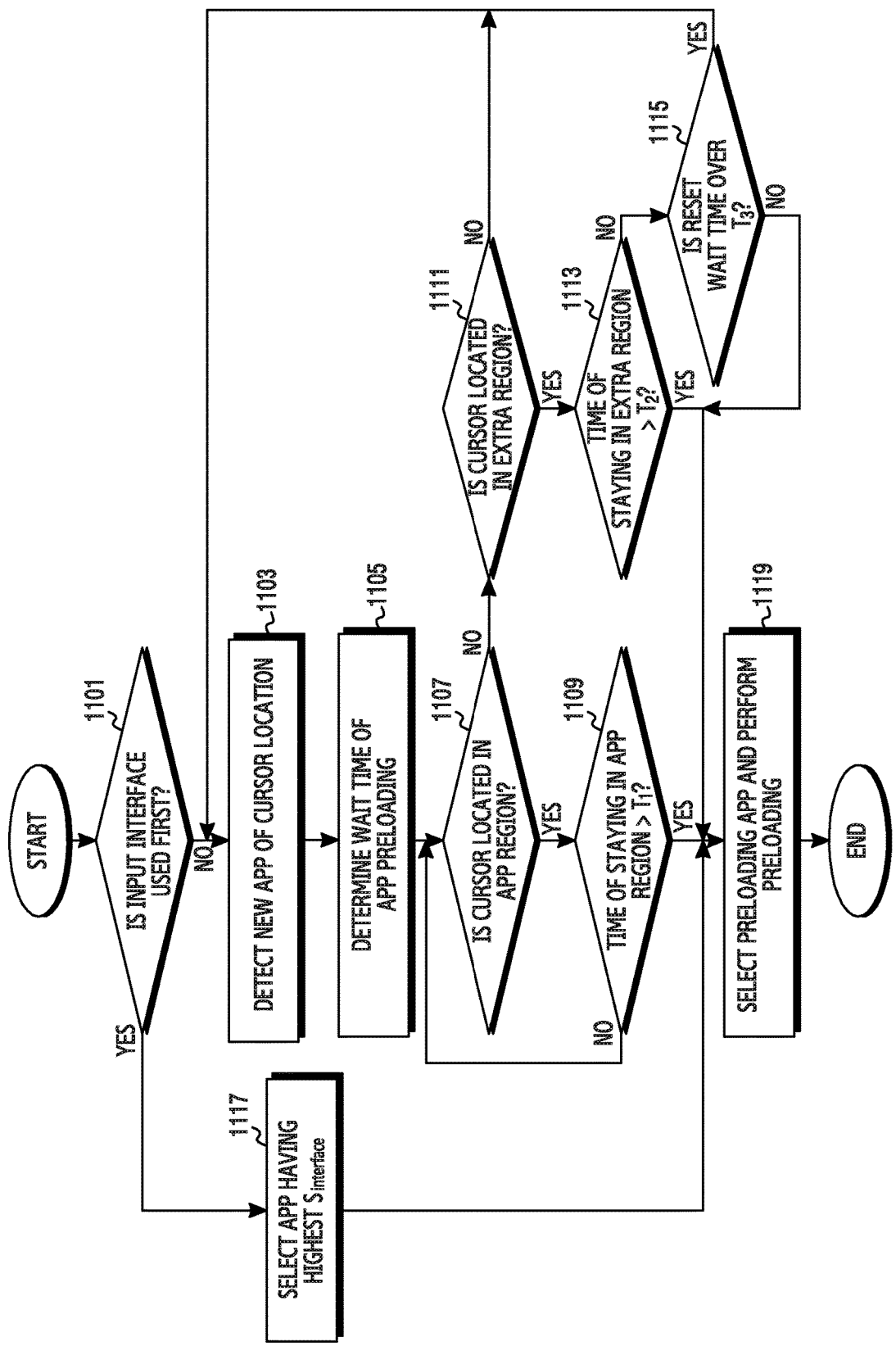
FIG. 11 is a flowchart illustrating an operation of selecting a preloading application by classifying an application region according to an embodiment of the present disclosure.

FIG. 11 is a flowchart illustrating an operation of selecting a preloading application by classifying an application region according to an embodiment of the present disclosure. In operation 1101, the electronic device 400 may identify whether an input interface to be used corresponds to an initially used interface. Herein, if the electronic device 400 is switched off and thereafter is switched on again, the initial use implies an input interface initially used at a later time. If the input interface to be used is initially used, in operation 1117, the electronic device 400 may select an application having a high $S_{interface}$. Herein, the number of applications to be selected may be limited to up to a specific number N in a descending order of the $S_{interface}$ according to a state of the electronic device. N may be any number, and may be determined by a user's selection or by considering a state of the electronic device 400. Herein, the $S_{interface}$ may be determined based on an application launching count and launching time of each case where the input interface is used. For example, the $S_{interface}$ may be high if a specific application has a great launching count and a long launching time while a specific input interface is used. Alternatively, if a specific external electronic device is coupled with the electronic device 400, the $S_{interface}$ may be separately managed for each specific external device. In operation 1199, the electronic device 400 may select and preload the application selected in operation 1117 as a preloading application.

Otherwise, if the input interface is not initially used, in operation 1103, the electronic device 400 may detect a new application input at a location of a cursor controlled based on the input interface. That is, if the cursor is located in the application region, the electronic device 400 may detect the new application input. For example, the application region is indicated by a reference numeral 1201 in FIG. 12A. Herein, the new application input implies an application that has not yet been preloaded. Thereafter, in operation 1105, the electronic device 400 may determine a preloading wait time of the new application. Herein, the preloading wait time implies a wait time for preloading an application indicated by a cursor. The preloading wait time may be determined by referring to $S_{APP}$ (or $S_{device}$ if the external device is coupled) provided from the history data management unit of a corresponding application. For example, the greater the $S_{APP}$ (or $S_{device}$), the shorter the preloading wait time may be set.

Figure 12A:
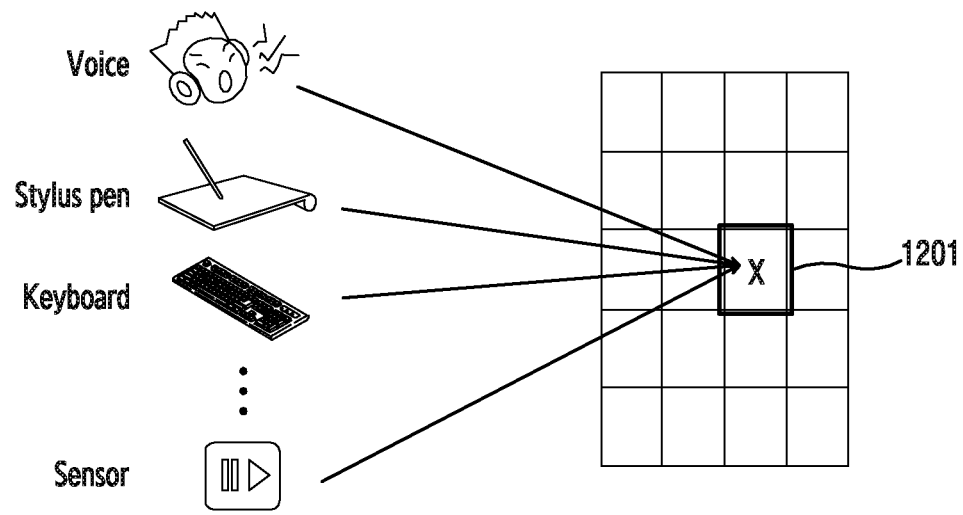
FIGS. 12A and 12B illustrate an example for identifying an application region according to an embodiment of the present disclosure.
Figure 12B:
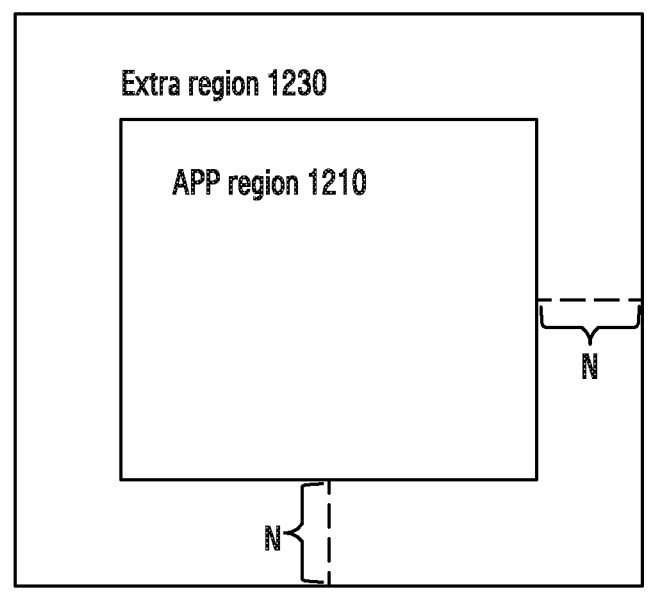

After the preloading wait time of the application is determined, in operation 1107, the electronic device 400 may identify a location indicated by the cursor. This is illustrated in FIG. 12B, and the electronic device 400 may determine whether the location indicated by the cursor corresponds to an APP region 1210, an extra region 1230, or another region 1250. The APP region 1210 which has a relatively significant meaning may be referred to as a first region, and the extra region 1230 may be referred to as a second region. The first region implies a region corresponding exactly to an application image displayed through the display unit of the electronic device 400, and the second region may include a region not overlapping with the first region and extended by a specific width in four directions from the first region. For example, as shown in FIGS. 12A and 12B, the second region may imply a region which is further extended by a distance of about n in four sides of the first region. According to an embodiment, the first region (the APP region 1210) may correspond to a region 1201 of FIG. 12A. According to another embodiment, a region including the first region (the APP region 1210) and the second region (the extra region 1230) may correspond to the region 1201 of FIG. 12A.

If it is determined that the cursor is located in the APP region 1210, in operation 1109, the electronic device 400 may determine whether a time for which the cursor stays in the APP region 1210 is greater than a preloading wait time $T_1$. $T_1$ is any time, and may be determined by a user or may be determined by considering a state of the electronic device 400. According to an embodiment, $T_1$ may be 2 seconds. If the cursor stays in the APP region 1210 for more than $T_1$, in operation 1119, the electronic device 400 may select and preload a corresponding application as a preloading target application. Otherwise, if the time for which the cursor stays on the APP region 1210 is shorter than $T_1$, returning to operation 1107, the electronic device 400 may determine whether a current cursor location corresponds to the APP region 1210, the extra region 1230, or another region 1250.

If it is determined in operation 1107 that the cursor is not located in the APP region 1210, in operation 1111, the electronic device 400 may determine whether the cursor controlled through an input interface is located in the extra region 1230. If it is determined that the cursor is not located in the extra region 1230, returning to operation 1103, the electronic device 400 may detect a new application input. Otherwise, if the cursor is located in the extra region 1230, in operation 1113, the electronic device 400 may determine whether a time for which the cursor stays in the extra region 1230 is greater than $T_2$. $T_2$ is any time, and may be determined by a user or may be determined by considering a state of the electronic device 400. For example, $T_2$ may be 3 seconds. According to an embodiment, $T_1$ may be less than $T_2$. This is because, in a case where the cursor is located in the APP region 1210, a probability of executing a corresponding application is higher empirically in comparison with a case where the cursor is located in the extra region 1230. If the cursor stays in the extra region 1230 for more than $T_2$, in operation 1119, the electronic device 400 may select and preload a corresponding application as a preloading target application. Otherwise, if the time for which the cursor stays in the extra region 1230 is shorter than $T_2$, in operation 1115, the electronic device 400 may determine whether a time for which the cursor returns to the extra region 1230 is shorter than a reset time $T_3$. This is to consider a case where it is difficult to precisely adjust the location of the cursor, or where the cursor is moved to another region 1250 and then returns to the extra region 1230 due to a user's mistake or the like. That is, any reset wait time $T_3$ may be predetermined, and it is possible to determine whether the time for which the cursor returns to the extra region 1230 after moving to another region 1250 is less than a set reset time $T_3$. $T_3$ is any time, and may be determined by a user or may be determined by considering a state of the electronic device 400. For example, $T_3$ may be 1 second. If the return time of the cursor is less than $T_3$, the electronic device 400 may regard that the cursor stays in the extra region 1230 continuously in the determining of whether the time for which the cursor stays in the extra region 1230 is greater than $T_2$. However, if the cursor is out of the extra region 1230 and the reset time $T_3$ is over, a corresponding task is reset, and returning to operation 1103, a new application may be detected.

Although not shown in FIGS. 4A and 4B, the electronic device 400 equipped with the smart platform may include a display unit capable of displaying a variety of information. The display unit may include a touch panel to detect a user's touch input. Thus, the display unit may be referred to as the touch screen. The touch screen may detect the user's touch input by using, for example, a capacitive type, a resistive type (pressure-sensitive type), or the like. The electronic device 400 may be controlled by a user's input which is input through the touch screen. Specifically, the touch input may be defined in three categories according to a sensitivity of pressing the touch screen and a duration time. For example, it may be defined as a touch if it is pressed with at least a critical strength $N_1$ for a time duration slightly shorter than a critical time $T_1$ (e.g., 0.5 second), as a peak if it is pressed slightly with a strength less than a critical strength $N_1$ for at least a critical time $T_1$, and as a pop if it is pressed with a strength greater than the critical strength $N_1$ after the peak. Herein, the touch may be referred to as a first type input, the peak may be referred to as a second type input, and the pop may be referred to as a third type input. A criterion for dividing the pressing sensitivity and time may be presented by parameters, and may be applied flexibly according to a specification and usage of the electronic device 400.

If the sensitivity and time of pressing a region corresponding to an application icon of a touch screen by a user to execute the application correspond to a peak, the electronic device 400 may select a corresponding application as a preloading application.

Further, in addition to a case of touching the application icon, if a peak input is applied to a specific target, an application corresponding to a pop input is selected thereafter as the preloading application. For example, if a link of a website is a peak in an application (a text message, a messenger, a notepad, etc.) other than a browser, the link is briefly displayed through the touch screen of the electronic device 400, and an operation of accessing the link through the browser after the pop input may be assumed. In this case, the electronic device 400 selects a browser application as the preloading application.

However, although a corresponding application is preloaded due to a peak operation, if a pop is not executed thereafter and another operation is performed, a preloaded application is task-killed.

Figure 13:
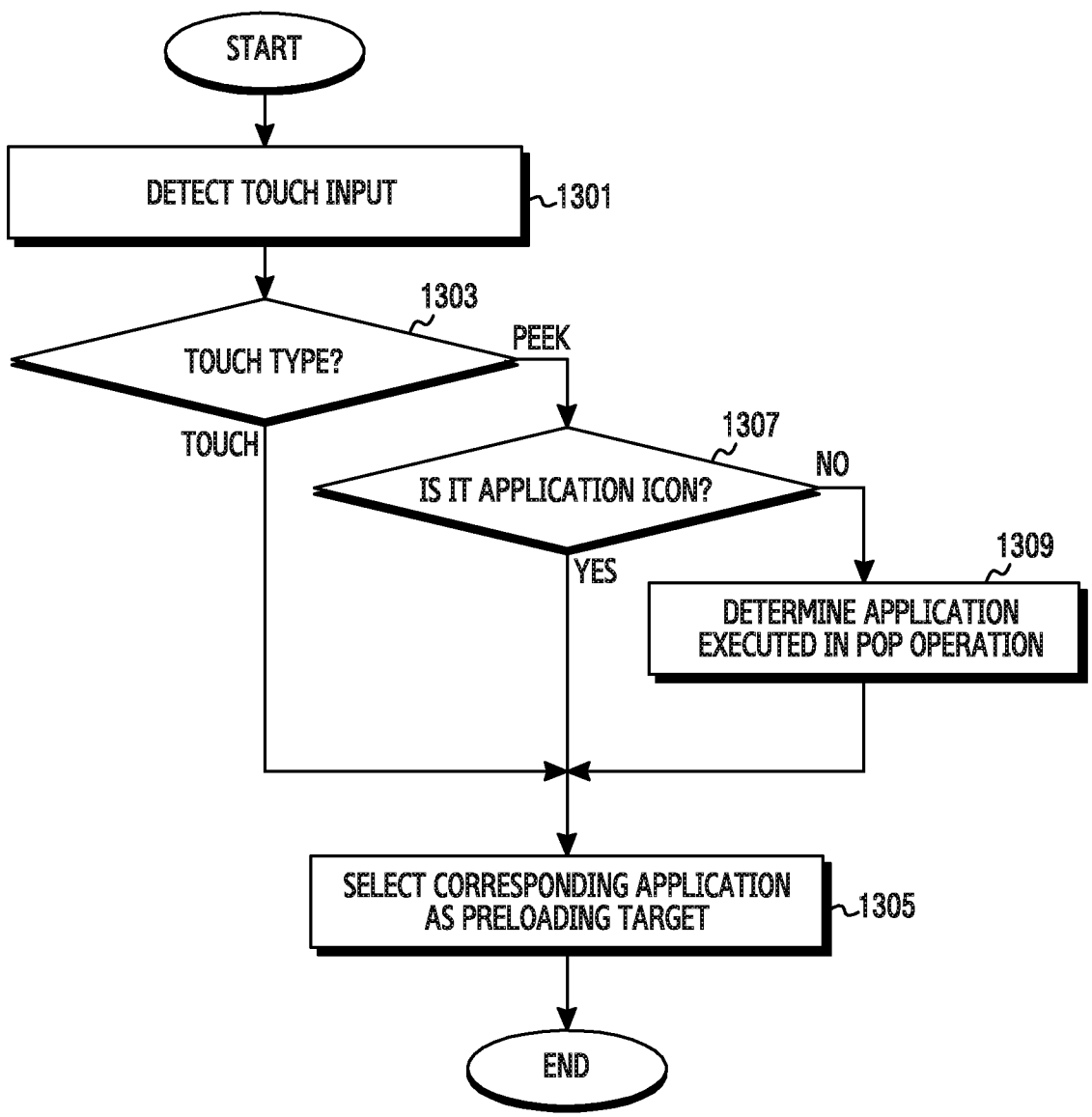
FIG. 13 is a flowchart illustrating an operation of selecting a preloading application by using a touch input method according to an embodiment of the present disclosure.

FIG. 13 is a flowchart illustrating an operation of selecting a preloading application by using a touch input method according to an embodiment of the present disclosure.

Although not shown in FIGS. 4A and 4B, the electronic device 400 may further include a display unit, and the display unit may include a touch panel for detecting a user's touch input. Therefore, the display unit may be referred to as a touch screen. The touch screen may detect the user's touch input by using a capacitive type, a resistive type (pressure-sensitive type), or the like. In operation 1301, the electronic device 400 may detect the user's touch input which is input through the touch screen.

Thereafter, in operation 1303, the electronic device 400 may determine a touch input type for the user touch input. The user touch input may be defined in three categories according to a sensitivity and time of pressing the touch screen. For example, it may be defined as a touch if it is pressed with at least a critical strength $N_1$ for a time duration slightly shorter than a critical time $T_1$ (e.g., 0.5 second), as a peak if it is pressed slightly with a strength less than a critical strength $N_1$ for at least a critical time $T_1$, and as a pop if it is pressed with a strength greater than the critical strength $N_1$ after the peak. Herein, the touch may be referred to as a first type input, the peak may be referred to as a second type input, and the pop may be referred to as a third type input. A criterion for dividing the pressing sensitivity and time may be presented by parameters, and may be applied flexibly according to a specification and usage of the electronic device 400.

If the touch input type is determined as a touch, in operation 1305, the electronic device 400 may select and preload an application which exists at a touched position as a preloading application.

If the touch input type is determined as a peak, in operation 1307, the electronic device 400 may determine whether a peak input is achieved in an application icon. Herein, the application icon may be indicated by a reference numeral 1201 of FIG. 12A. If the peak input is achieved in the application icon, in operation 1305, the electronic device 400 may select and preload a corresponding application as a preloading application.

On the contrary, it may be assumed a case where the peak input is achieved in another location other than the application icon. For example, it may be assumed a case where a link of a website is a peak in another application (text messaging, messenger, notepad, etc.) other than a browser application. In this case, if a corresponding link is briefly viewed through the display unit of the electronic device 400 and thereafter a pop operation is achieved, a link access operation may be achieved through the browser application. Therefore, if the peak input is achieved in another location other than the application icon, in operation 1309, the electronic device 400 may select an application scheduled to be executed according to a pop input. In addition, in operation 1305, the selected application may be selected and preloaded as the preloading application. However, although a corresponding application is preloaded due to a peak operation, if a pop is not executed thereafter and another operation is performed, a preloaded application is task-killed.

There are several types of electronic devices equipped with a smart platform used by an individual user. For example, an electronic device such as a smart phone, a table, a smart watch, smart glasses, a drone, or the like may be equipped with the smart platform. An electronic device that can be used by interworking with other devices may have a different type of applications frequently used, based on a usage purpose. In this case, preloading application information varies for each device, and if a specific device is used by replacement, the existing preloading application information will disappear. Therefore, the preloading application information may be applied on a real time basis as a cloud account, and the preloading application information of several electronic devices may be shared by selectively applying it through a manager application of a main electronic device such as a smart phone.

The applying of the preloading application information on a real time basis through the cloud account is possible if the main electronic device is coupled with a network. The main electronic device may share the preloading application information through an interface (Wi-Fi, Wi-Fi Direct, network, Bluetooth, etc.) associated with interworking sub-electronic devices. In this case, the manager application which manages the electronic devices may be used to deliver parameters required in sharing.

Figure 14:
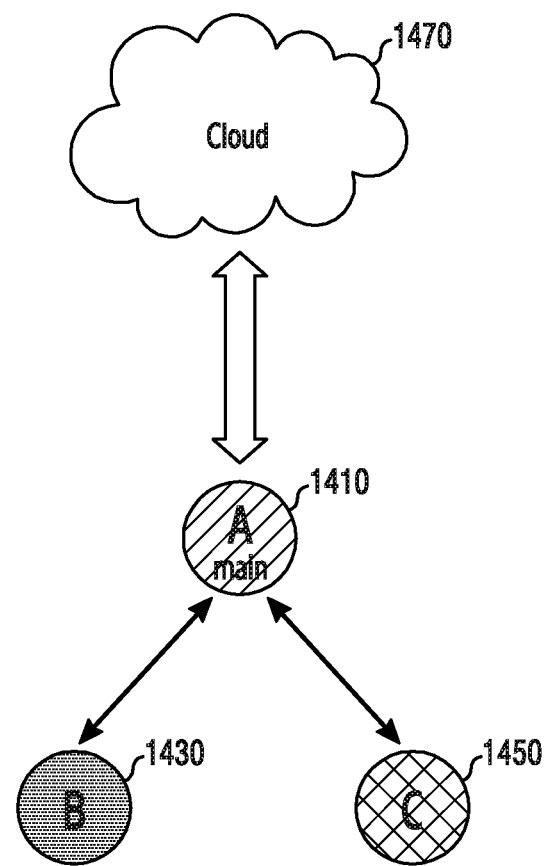
FIG. 14 illustrates a method of sharing information regarding a preloading application between electronic devices according to an embodiment of the present disclosure.

Referring to FIG. 14, the main electronic device 1410 categorizes types of interworking sub-electronic devices 1430 and 1450 to differentiate and arrange a unique preloading application score $S_D$ with respect to a corresponding sub-electronic device. Herein, the $S_D$ is a score stored in a corresponding interworking sub-electronic device, and may be determined based on an accumulated launching count and launching time of an application. For example, if the interworking sub-electronic device 1430 is a smart watch, the main electronic device 1410 may receive $S_D$ information from the sub-electronic device 1430 and store and manage the information by classifying it as a smart watch category. In addition, the $S_D$ arranged in the main electronic device 1410 may be used by applying it on a real time basis to the cloud 1470. Herein, the main electronic device 1410 may correspond to the electronic device 400 of FIGS. 4A and 4B, and the sub-electronic device may correspond to an external electronic device.

Figure 15:
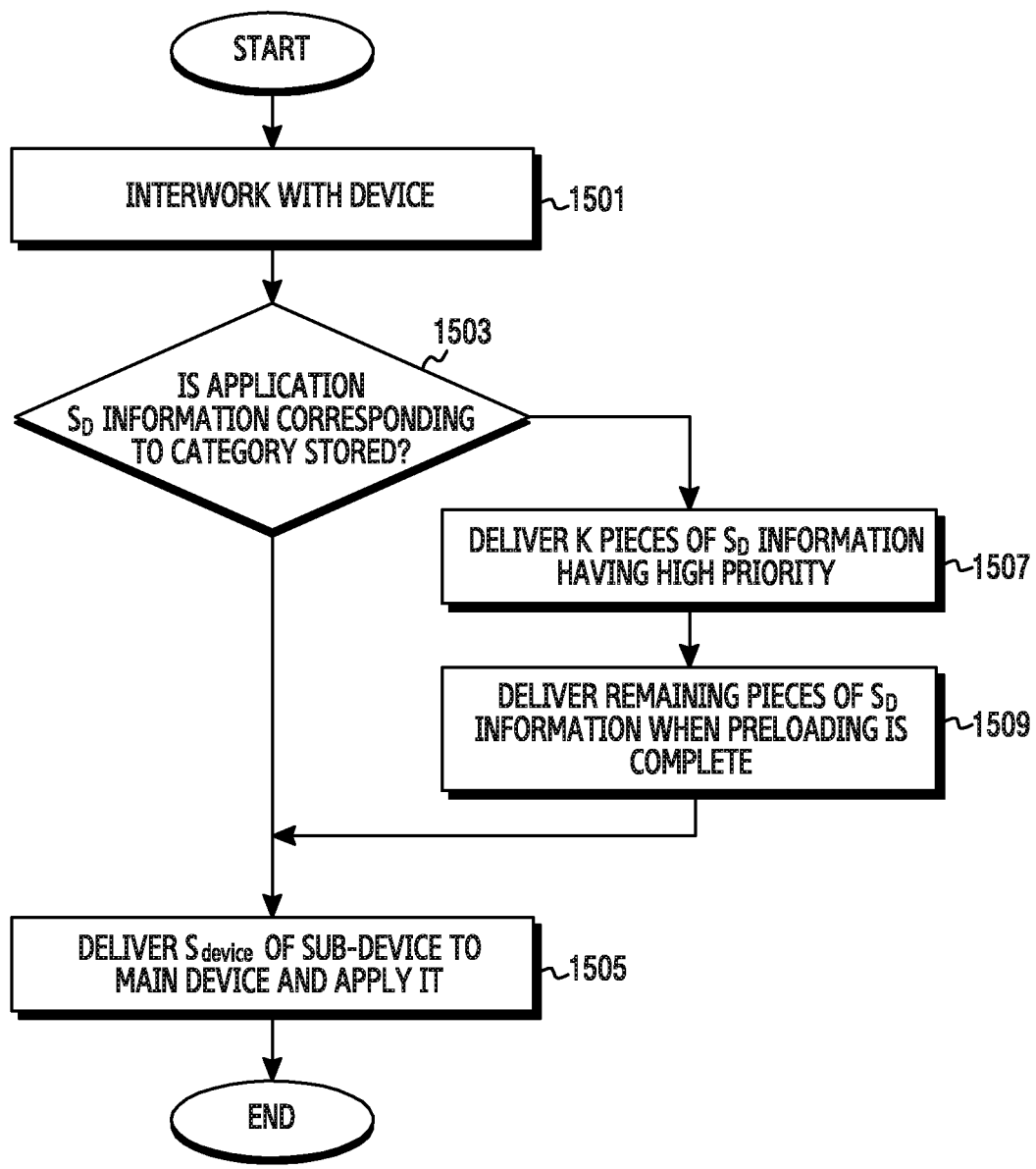
FIG. 15 is a flowchart illustrating a method of sharing $S_D$ information if interworking is achieved between electronic devices according to an embodiment of the present disclosure.

FIG. 15 is a flowchart illustrating a method of sharing $S_D$ information if interworking is achieved between electronic devices according to an embodiment of the present disclosure. If the main electronic device 1410 interworks with the sub-electronic devices 1430 and/or 1450, information regarding a preloading application may be shared through the operation of the flowchart of FIG. 15. Herein, the main electronic device 1410 may correspond to the electronic device 400 of FIGS. 4A and 4B, and the sub-electronic devices 1430 and 1450 may correspond to the aforementioned external electronic device.

Specifically, in operation 1501, the electronic device 400 may detect the interworking with the external electronic device, and may generate a sensing event. The electronic device 400 may interwork with the external electronic device, for example, through Wi-Fi, Wi-Fi Direct, network, Bluetooth, or the like. If preloading application information is shared, the electronic device 400 may be the main electronic device, and the external electronic device may be the sub-electronic device.

If the external electronic device interworks with the main electronic device 400, in operation 1503, the main electronic device 400 may classify a category of the interworking external electronic device, and may determine whether application $S_D$ information corresponding thereto is stored in the electronic device 400. Alternatively, the electronic device 400 may determine whether the application $S_D$ information corresponding to the classified category is stored in a cloud through a network connection with a server.

If the application $S_D$ information corresponding to the category to which the interworking external electronic device belongs is not stored in the electronic device 400 or the cloud, in operation 1505, the electronic device 400 may store the application $S_D$ information corresponding thereto by receiving it from the external electronic device. Alternatively, the electronic device 400 may store and manage the received $S_D$ information of the application corresponding the external electronic device by uploading it the cloud through the network connection.

On the contrary, it may be assumed a case where the application $S_D$ information corresponding the category to which the interworking electronic device belongs is stored in the electronic device 400 or the cloud. In this case, in operation 1507, the electronic device 400 may preferentially deliver K pieces of $S_D$ information having a high priority to the external electronic device among the application $S_D$ information corresponding the category to which the external electronic device belongs. This is to avoid an overhead which may occur if data is transmitted concurrently since the $S_D$ information has a significantly great amount of data. Therefore, if the application corresponding to the K pieces of $S_D$ information is completely preloaded in the external electronic device, in operation 1509, the electronic device 400 may transmit the remaining pieces of $S_D$ information to the external electronic device. However, an embodiment in which all pieces of $S_D$ information corresponding to the category to which the external electronic device belongs are transmitted concurrently instead of being transmitted separately in two steps as described above.

Upon completion of the preloading in the external electronic device, in operation 1505, the changed $S_D$ information of the external electronic device may be applied and updated in the electronic device 400.

Figure 16:
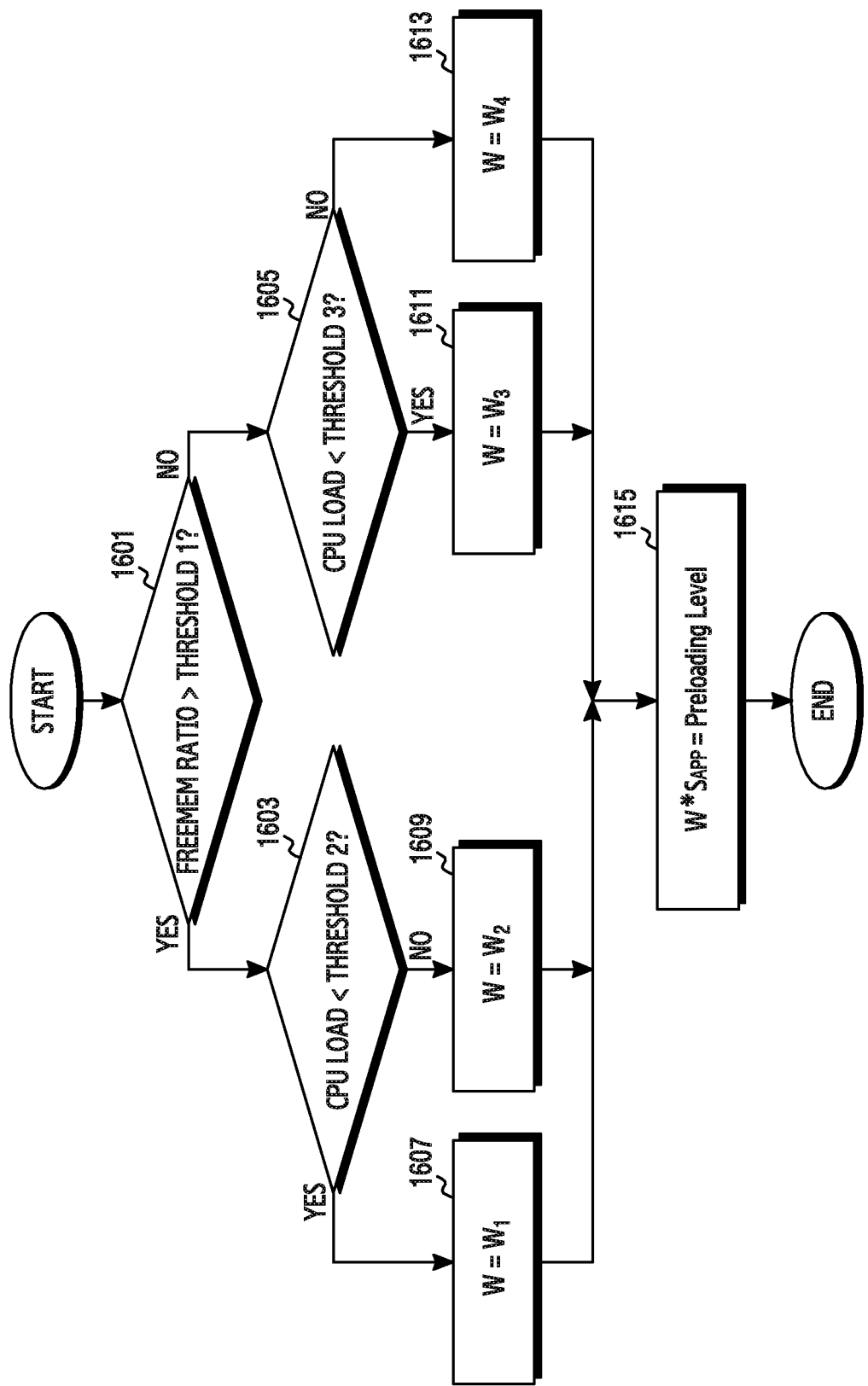
FIG. 16 is a flowchart for determining a preloading level according to an embodiment of the present disclosure.
Figure 17:
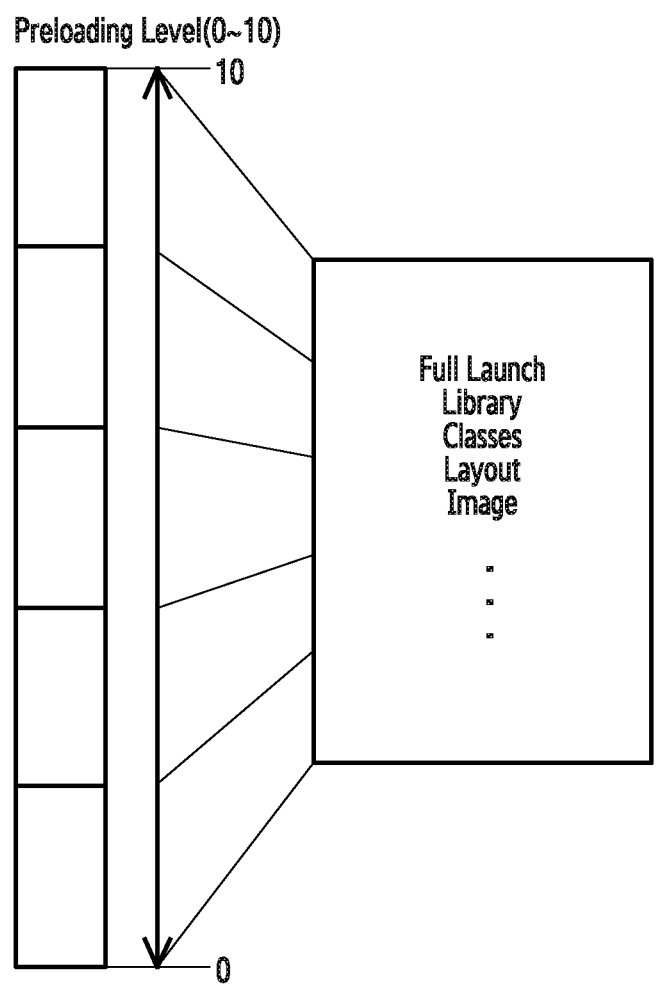
FIG. 17 illustrates identifying of a preloading level based on a resource type according to an embodiment of the present disclosure.

FIG. 16 is a flowchart for determining a preloading level according to an embodiment of the present disclosure. The present disclosure proposes a method in which preloading is performed in a stepwise manner according to a resource type (all, library, classes, layout, image, etc.). As an embodiment, the preloading level is classified according to the resource type as shown in FIG. 17. In this case, a step of performing preloading based on the preloading level (0 to 10) may be determined. In addition, an operation criterion (the number of resources) of the preloading level is changeable according to a specification of a terminal, and a duration in which the preloading is not performed may be set by considering a state or the like of the electronic device 400.

A detailed operating method is as follows. In operation 1601, the electronic device 400 may determine a free memory ratio of the second memory 490 embedded in the electronic device 400. Specifically, with respect to a specific threshold 1, if the free memory ratio is higher than the threshold, it may be determined as high, and otherwise it may be determined as low. For example, if the free memory ratio is higher than 50%, it may be determined as high, and otherwise it may be determined as low. Thereafter, the electronic device 400 may determine a load of a Central Processing Unit (CPU) in operation 1603 if the free memory ratio is determined as high, or in operation 1605 if the free memory ratio is determined as low. Specifically, in operation 1603, if the CPU load is lower than a specific threshold 2, it may be determined as low, and otherwise it may be determined as high. For example, it may be determined as low if the CPU load is lower than 60% of a total CPU capacity, and otherwise may be determined as high. In addition, in operation 1605, it may be determined as low if the CPU load is lower than a specific threshold 3, and otherwise may be determined as high. For the purpose of explanation, not for the purpose of limitation of the embodiment, the threshold 2 and the threshold 3 may be set to have the same value. Thereafter, in operations 1607 to 1613, the electronic device 400 may determine a weight W by considering the free memory ratio and the CPU load. Herein, a relationship of $W_1 > W_2 > W_3 > W_4$ may be satisfied.

In operation 1615, the electronic device 400 may determine the preloading level based on the values $W_1$ to $W_4$ determined through the operations 1607 to 1613. According to an embodiment, the preloading level may be determined by a product of $S_{APP}$ determined by considering an application's launching count and launching time received from the history data management unit 410 and the value W obtained by considering a current state (CPU load, memory) of a terminal. According to another embodiment, if the external device is coupled with the electronic device 400, the preloading level may be determined by multiplying $S_{interface}$ and the value W. According to another embodiment, if an input interface is used, the preloading level may be determined by a product of $S_{interface}$ and the value W. Herein, for the purpose of explanation, not for the purpose of limitation of the embodiment, it is assumed that the preloading level is determined by a product of the $S_{APP}$ and the value W. In this case, the value $S_{APP}$ may have a value ranging from 0 to 10 which is the same range of the preloading level, and the value W may be determined based on a CPU load and a free memory ratio of the entire memory. The value W is a value in the range of 0 to 1, and may indicate a ratio (%) by which the $S_{APP}$ is applied based on the current state of the terminal. For example, if the value W is '0' (0%), the preloading level is 0 irrespective of the $S_{APP}$, and thus a corresponding application may not be preloaded at all.

The step performed based on the preloading level may be determined after determining the preloading level.

Figure 18:
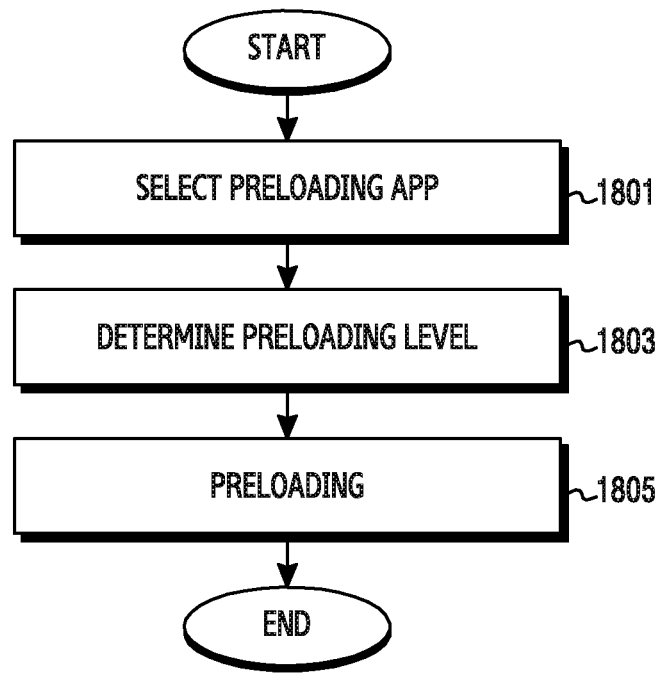
FIG. 18 is a flowchart illustrating an overall operation of the electronic device 400 according to an embodiment of the present disclosure.

FIG. 18 is a flowchart illustrating an overall operation of the electronic device 400 according to an embodiment of the present disclosure. In operation 1801, the electronic device 400 may predict the use of a specific application to select it as a preloading target application in advance. Specifically, first, the electronic device 400 may select the preloading target application by considering the application's accumulated launching count and launching time while the external device is coupled, based on a connection mechanism and a type of the external device interworking with the electronic device 400. Second, the electronic device 400 may divide a page attribute into a displayed page and a hidden page, and may select the preloading target application by considering the page attribute and the application's accumulated launching count. Third, the electronic device 400 may select the preloading application based on a location indicated by an input interface if an application of the electronic device 400 is directly executed via the input interface. Forth, the electronic device 400 may select the preloading application based on a type of a touch input by classifying a user touch input which is input through a touch panel into 3 types. A method of selecting the preloading application based on the four types is described in detail in the process described with reference to FIG. 6 to FIG. 13.

Upon selecting the preloading target application, in operation 1803, the electronic device 400 may determine the preloading level for the target application. A process of determining the preloading level is as follows. According to an embodiment, the preloading level may be determined by a product of $S_{APP}$ determined by considering an application's launching count and launching time received from the history data management unit 410 and a weight W obtained by considering a current state (CPU load, free memory) of a terminal. According to another embodiment, if the external device is coupled with the electronic device 400, the preloading level may be determined by multiplying $S_{interface}$ and the value W. According to another embodiment, if an input interface is used, the preloading level may be determined by multiplying $S_{interface}$ and the value W.

Upon determining the preloading level, in operation 1805, the electronic device 400 may determine the step performed based on the preloading level. The specific level is a factor that can be determined by considering a performance, current state, or the like of the electronic device 400.

Optionally, the operation 1801 may be omitted in the flowchart of FIG. 18. That is, it is possible to consider an embodiment in which all applications included in the electronic device 400 are considered as the preloading target without an additional operation of selecting the preloading target application, and accordingly, the preloading level is determined by multiplying the $S_{APP}$ (or $S_{device}$ or $S_{interface}$) corresponding to each application and the value W indicating the current state of the electronic device 400.

History data required to select the preloading application and determine the preloading level may be used in the present disclosure. The history data management unit 410 may persistently use the history data for application usage information of a user by storing it in the first memory 470 of the electronic device in a form of a file. The history data management unit 410 may update and maintain a relative score by considering an application's accumulated execution count and launching time received on a real time basis. The relative score may be determined by taking a value which is twice an average value of all application's execution count and launching time as a maximum (max) score. The calculated execution count score and launching time score are present in an application executed at least one time in the electronic device 400, and may be classified into categories (game, health, education, finance, etc.) according to an application attribute. The classification of the categories may be achieved based on a criterion classified in an application market or the like. In addition, the history data may be transferred to be used for an additional use in other electronic devices of the user.

Figure 19:
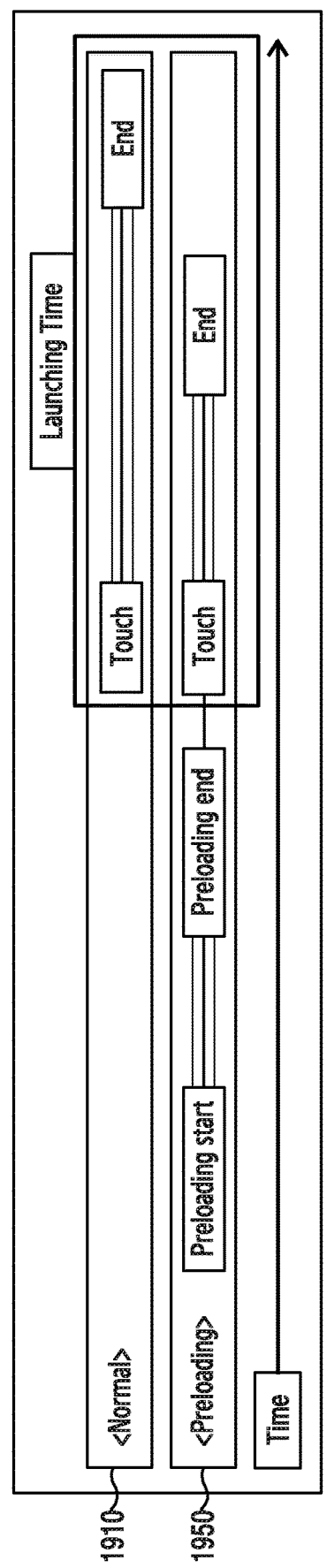
FIG. 19 illustrates an effect of reducing a launching time of a preloaded application according to an embodiment of the present disclosure.

FIG. 19 illustrates an effect of reducing a launching time of a preloaded application according to an embodiment of the present disclosure. A reference numeral 1910 indicates a launching time of an application which is not preloaded. A reference numeral 1950 indicates a launching time of an application which is preloaded. Herein, the same application is executed at the time indicated by the reference numerals 1910 and 1950. By comparing the reference numeral 1910 and the reference numeral 1950, it can be seen that the launching time can be reduced through precoding.

Figure 20:
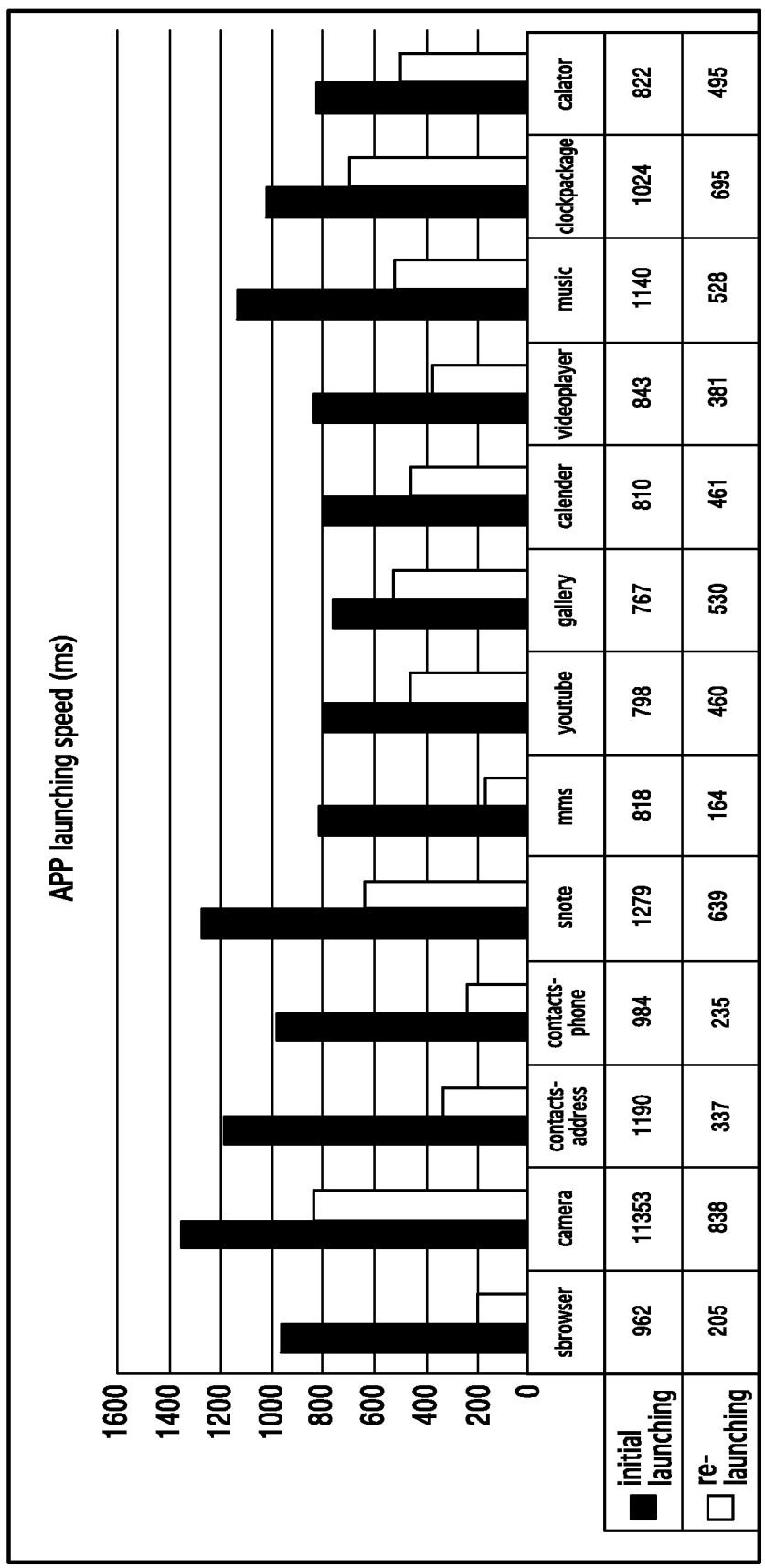
FIG. 20 illustrates an effect according to an embodiment of the present disclosure.

FIG. 20 illustrates an effect according to an embodiment of the present disclosure. An application to be executed by a user is pre-selected and executed (preloaded) in advance to improve a launching speed experienced by the user. A time difference between application's initial launching and re-launching is as shown in FIG. 19. Numerically, a re-launching time is faster by about 47% on average. It is expected to improve performance numerically by applying the present disclosure.

In addition, a method of compensating for the problem of the conventional preloading scheme may lead to an increase in a range of a preloading application, a decrease in an overhead, and an improvement of memory efficiency. Since a preloading target is selected by predicting it based on three factors, it is possible to select a wide range of preloading application in which a user's application execution pattern is considered. In addition, it is possible to adjust an amount of resources to be loaded to the second memory 490 if an application is executed in advance due to a preloading level, and memory efficiency can be improved since a preloading application is changed by considering a user's behavior on a real time basis. Finally, since a terminal's current CPU load and a free memory ratio are considered in preloading, an overhead can be reduced.

A preloading application and a preloading level can be determined by considering an application execution pattern of a user and a current state of a terminal. Accordingly, if the application is executed, a launching speed experienced by the user can be improved and memory efficiency can be increased.

Since a plurality of factors are used in prediction to select a preloading target, it is possible to select a preloading application widely based on the application execution pattern of the user. In addition, an amount of resources which are read by a memory can be adjusted if executed in advance due to the determined preloading level, and the preloading application is changed by considering a user's behavior on a real-time basis, thereby improving memory efficiency. Finally, an overhead can be decreased by referring to a current Central Processing Unit (CPU) load and memory ratio of a terminal if preloaded.

Methods based on embodiments disclosed in the claims and/or specification of the present disclosure can be implemented in hardware, software, or a combination of both.

If implemented in software, computer readable recording medium for storing one or more programs (i.e., software modules) can be provided. The one or more programs stored in the computer readable recording medium are configured to be executed by one or more processors in an electronic device. The one or more programs include instructions for allowing the electronic device to execute the methods based on embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory may be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the present disclosure via an external port. In addition, an additional storage device on a communication network can have an access to the device for performing an embodiment of the present disclosure.

While the present disclosure has been shown and described with reference to certain preferred embodiments thereof, it will be understood by those skilled in the art that various changes in form and details may be made therein without departing from the spirit and scope of the present disclosure as defined by the appended claims. Therefore, the scope of the present disclosure is defined not by the detailed description thereof but by the appended claims, and all differences within equivalents of the scope will be construed as being included in the present disclosure.

What is claimed is:

1. A method of operating an electronic device, the method comprising:
    detecting a connection of an external device to the electronic device;
    in response to identifying that a waiting time in a first page exceeds a threshold, identifying one or more first applications displayed in the first page and one or more second applications displayed in a second page based on a type of the external device; and
    preloading at least one first application and at least one second application to a memory,
    wherein the first page is a page being displayed on the electronic device and the second page is a page not being displayed on the electronic device, and
    wherein number of the one or more first applications is greater than number of the one or more second applications.

2. The method of claim 1, wherein the identifying of the one or more first applications and the one or more second applications comprises:
    identifying a set of selection target applications based on the type of the external device; and
    identifying the one or more first applications and the one or more second applications from the set of selection target applications based on a launching count of each application in the set of selection target applications.

3. The method of claim 1,
    wherein the at least one first application and the at least one second application to be preloaded are identified based on a cursor controlled through an input interface, the cursor being located in a region corresponding to at least one of the at least one first application and the at least one second application for at least a wait time.

4. The method of claim 3, wherein the at least wait time is determined based on a score of each of the at least one first application and the at least one second application.

5. The method of claim 3, wherein the region comprises an application region and an extra region,
    wherein a wait time of the application region is less than a wait time of the extra region, and
    wherein the application region is closer to an icon of the at least one first application than the extra region.

6. The method of claim 1, further comprising:
    detecting a disconnection between the external device and the electronic device; and
    in response to detecting the disconnection, performing a task-kill of the preloaded at least one first application and at least one second application.

7. The method of claim 1, wherein the preloading of the at least one first application and the at least one second application further comprises:
    determining a preloading level for the at least one first application and the at least one second application; and
    preloading the at least one first application and the at least one second application in a stepwise manner based on the preloading level,
    wherein the preloading level is determined based on a score of each of the at least one first application and the at least one second application, and a variable indicating a state of the electronic device.

8. The method of claim 7,
    wherein the variable is determined based on at least one of a central processing unit (CPU) load of the electronic device or a free memory proportion of the memory, and
    wherein the preloading level is a product of the variable and the score.

9. The method of claim 1, further comprising:
    sharing information regarding a preloading application through a connection with the external device; and
    uploading the information regarding the preloading application to a server,
    wherein the information regarding the preloading application comprises information regarding a score for each application of the electronic device and a score for each application of the external device.

10. The method of claim 9, further comprising:
    downloading the information regarding the preloading application stored in the server; and
    transmitting the information regarding the preloading application of the external device included in the downloaded information to the external device or a second external device belonging to a same category as the external device.

11. The method of claim 9, further comprising updating the information regarding the preloading application uploaded to the server.

12. The method of claim 1, wherein the external device comprises a wearable device.

13. An electronic device comprising:
    at least one processor configured to:
        detect a connection of an external device to the electronic device;
        in response to identifying that a waiting time in a first page exceeds a threshold, identify one or more first applications displayed in a first page and one or more second applications displayed in a second page based on a type of the external device; and
        preload at least one first application and at least one second application to a memory,
    wherein the first page is a page being displayed on the electronic device and the second page is a page not being displayed on the electronic device, and
    wherein number of the one or more first applications is greater than number of the one or more second applications.

14. The electronic device of claim 13, wherein the at least one processor is further configured to:
    identify a set of selection target applications based on the type of the external device; and
    identify the one or more first applications and the one or more second applications from the set of selection target applications based on a launching count of each application in the set of selection target applications.

15. The electronic device of claim 13,
    wherein the at least one first application and the at least one second application to be preloaded are identified based on a cursor controlled through an input interface, the cursor being located in a region corresponding to at least one of the at least one first application and the at least one second application for at least a wait time.

16. The electronic device of claim 15, wherein the at least wait time is determined based on a score of each of the at least one first application and the at least one second application.

17. The electronic device of claim 13, wherein the at least one processor is further configured to:
- detect a disconnection between the external device and the electronic device; and
- in response to detecting the disconnection, perform a task-kill of the preloaded at least one first application and at least one second application.

18. The electronic device of claim 13,
wherein the at least one processor is further configured to:
- determine a preloading level for the at least one first application and the at least one second application, and
- preload the at least one first application and the at least one second application in a stepwise manner based on the preloading level, and wherein the preloading level is determined based on a score of each of the at least one first application and the at least one second application, and a variable indicating a state of the electronic device.

19. The electronic device of claim 18,
wherein the variable is determined based on at least one of a central processing unit (CPU) load of the electronic device or a free memory proportion of the memory, and
wherein the preloading level is a product of the variable and the score.

20. The electronic device of claim 13, further comprising a transceiver configured to:
- share information regarding a preloading application through a connection with a first external device, and
- upload the information regarding the preloading application to a server, wherein the information regarding the preloading application comprises information regarding a score for each application of the electronic device and a score for each application of the first external device.

21. The electronic device of claim 20, wherein the at least one processor is further configured to:
- update the information regarding the preloading application uploaded to the server.

22. The electronic device of claim 20, wherein the at least one processor is further configured to:
- download the information regarding the preloading application stored in the server; and
- transmit the information regarding the preloading application of the external device included in the downloaded information to the external device or an external device belonging to a same category as the external device.

23. The electronic device of claim 13, wherein the external device comprises a wearable device.

* * * * *